(12) United States Patent
Inada et al.

(10) Patent No.: US 9,180,595 B2
(45) Date of Patent: Nov. 10, 2015

(54) MULTIPLE-JOINT INDUSTRIAL ROBOT

(75) Inventors: Takahiro Inada, Kakogawa (JP); Shinji Kitamura, Kakogawa (JP); Masato Yamamoto, Kakogawa (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 0 days.

(21) Appl. No.: 14/117,579

(22) PCT Filed: Apr. 2, 2012

(86) PCT No.: PCT/JP2012/002295
§ 371 (c)(1),
(2), (4) Date: Dec. 13, 2013

(87) PCT Pub. No.: WO2012/157169
PCT Pub. Date: Nov. 22, 2012

(65) Prior Publication Data
US 2014/0102240 A1   Apr. 17, 2014

(30) Foreign Application Priority Data

May 13, 2011 (JP) .................................. 2011-108818
Nov. 30, 2011 (JP) .................................. 2011-261260

(51) Int. Cl.
*B25J 17/02* (2006.01)
*B25J 19/00* (2006.01)

(52) U.S. Cl.
CPC .......... *B25J 17/0283* (2013.01); *B25J 19/0029* (2013.01); *Y10S 901/29* (2013.01); *Y10T 74/20311* (2015.01)

(58) Field of Classification Search
CPC .... B25J 19/0029; B25J 19/0025; B25J 9/104; B25J 9/042; B25J 9/06; B25J 9/102; B25J 9/046; B25J 9/1065; B25J 9/107; B25J 17/0275; B25J 17/0266; B25J 17/0283; B25J 17/0258; B25J 18/00; B25J 9/12

USPC .............. 74/490.01–490.03, 490.05–490.06; 901/15, 28, 29
See application file for complete search history.

(56) References Cited

U.S. PATENT DOCUMENTS

| 4,804,304 A * | 2/1989 | Tellden .......................... 414/735 |
| 6,389,921 B1 * | 5/2002 | Nada ........................... 74/490.02 |

(Continued)

FOREIGN PATENT DOCUMENTS

| DE | 102007056774 A1 | 6/2009 |
| JP | A-2003-136462 | 5/2003 |

(Continued)

OTHER PUBLICATIONS

Jul. 27, 2015 Search Report issued in European Application No. 12786771.1.

*Primary Examiner* — William Kelleher
*Assistant Examiner* — Jude Agendia
(74) *Attorney, Agent, or Firm* — Oliff PLC

(57) ABSTRACT

A wrist portion of a robot includes: a first movable portion configured to rotate relative to an arm portion around a first wrist axis; a second movable portion configured to rotate relative to the first movable portion around a second wrist axis; a third movable portion configured to rotate relative to the second movable portion around a third wrist axis; and a cable insertion portion through which an effector cable is inserted, the effector cable being used to supply electric power to an end effector attached to the third movable portion. The cable insertion portion is provided at the first movable portion so as to be located on the first wrist axis. Two motors among a plurality of motors configured to drive the wrist portion are attached to the first movable portion so as to sandwich the cable insertion portion in a direction perpendicular to the first wrist axis.

8 Claims, 10 Drawing Sheets

(56) References Cited

U.S. PATENT DOCUMENTS

| | | | |
|---|---|---|---|
| 7,028,578 B2 * | 4/2006 | Uematsu et al. | 74/490.05 |
| 7,703,349 B2 * | 4/2010 | Nihei et al. | 74/490.02 |
| 7,806,020 B2 * | 10/2010 | Forslund, et al. | 74/490.06 |
| 7,836,789 B2 * | 11/2010 | Haniya et al. | 74/490.06 |
| 8,020,467 B2 * | 9/2011 | Haniya et al. | 74/490.02 |
| 8,720,296 B2 * | 5/2014 | Yonehara et al. | 74/490.02 |
| 2004/0261562 A1 | 12/2004 | Haniya et al. | |
| 2005/0103148 A1 * | 5/2005 | Inoue et al. | 74/490.02 |
| 2008/0264195 A1 * | 10/2008 | Larsson et al. | 74/490.02 |
| 2010/0229671 A1 * | 9/2010 | Haniya et al. | 74/490.02 |
| 2012/0111135 A1 * | 5/2012 | Ichibangase et al. | 74/490.06 |

FOREIGN PATENT DOCUMENTS

| | | |
|---|---|---|
| JP | 2003-200376 A | 7/2003 |
| JP | 2004-276233 A | 10/2004 |
| JP | 2004-308268 A | 11/2004 |
| JP | 2009-006405 A | 1/2009 |
| JP | 2009-125846 A | 6/2009 |
| JP | 2009-220219 A | 10/2009 |
| KR | 10-2004-0051615 | 10/2002 |
| KR | 20-0441888 | 9/2008 |
| WO | 2010/127701 A1 | 11/2010 |

* cited by examiner

MULTIPLE-JOINT INDUSTRIAL ROBOT

TECHNICAL FIELD

The present invention relates to a multiple-joint industrial robot including an arm portion, a wrist portion coupled to a tip end portion of the arm portion, and a plurality of motors configured to drive the wrist portion, and particularly to a multiple joint industrial robot configured such that an effector cable through which electric power and the like are supplied to an end effector extends through a wrist portion.

BACKGROUND ART

Multiple-joint industrial robots are widely utilized for various operations, such as welding and painting. For example, PTL 1 discloses a spot welding robot including a wrist portion to which a spot welding gun is attached. In this robot, some of motors configured to drive the wrist portion are attached to a rear end of an arm portion. A cable through which electric power is supplied to the spot welding gun is attached to the wrist portion. This cable is routed outside the wrist portion.

CITATION LIST

Patent Literature

PTL 1: Japanese Laid-Open Patent Application Publication No. 2003-136462

SUMMARY OF INVENTION

Technical Problem

However, in a case where the motor is attached to the rear end of the arm portion as disclosed in PTL 1, a power transmission mechanism configured to transmit power from the motor to a tip end of the wrist portion needs to be provided. As a result, the number of parts increases, and this complicates the assembling of the wrist portion, and the size of the entire configuration of the wrist portion needs to be increased.

Especially, in a robot for spot welding, a cable tends to become large in diameter to supply a high current to a welding gun. To prevent this, a large-size protection structure needs to be attached to the wrist portion to protect the cable. In addition, in a case where the cable is large in diameter, it becomes extremely difficult to arrange the power transmission mechanism such that the power transmission mechanism does not interfere with the cable.

Here, an object of the present invention is to route the cable such that the cable does not hinder smooth operations and to reduce the size of the entire configuration of the wrist portion.

Solution to Problem

A multiple-joint industrial robot according to the present invention includes: an arm portion; a wrist portion coupled to a tip end portion of the arm portion; and a plurality of motors configured to drive the wrist portion, wherein: the wrist portion includes a first movable portion coupled to the arm portion and configured to rotate relative to the arm portion around a first wrist axis, a second movable portion coupled to the first movable portion and configured to rotate relative to the first movable portion around a second wrist axis extending in a direction different from a direction in which the first wrist axis extends, a third movable portion, which is coupled to the second movable portion and configured to rotate relative to the second movable portion around a third wrist axis extending in a direction different from the direction in which the second wrist axis extends, and to which an end effector is attached, and a cable insertion portion through which an effector cable is inserted, the effector cable being used to supply at least one of electric power, power, signals, and materials to the end effector; the cable insertion portion is provided at the first movable portion so as to be located on the first wrist axis; and two motors among the plurality of motors are attached to the first movable portion so as to sandwich the cable insertion portion in a direction perpendicular to the first wrist axis.

According to the above configuration, the effector cable is inserted through the cable insertion portion located on the first wrist axis that is a rotational center of the first movable portion. Therefore, the effector cable can be successfully prevented from significantly whirling in accordance with the operation of the wrist portion and interfering with peripheral structures. Two motors among a plurality of motors configured to drive the wrist portion are attached to the first movable portion so as to sandwich the cable insertion portion located on the first wrist axis that is the rotational center of the first movable portion. Therefore, the weight balance of the first movable portion can be kept at the time of the rotation of the first movable portion. In addition, the distance from each of the two motors to the corresponding movable portion becomes short, so that a power transmission mechanism can be simplified.

The multiple-joint industrial robot may be configured such that: the second wrist axis is perpendicular to the first wrist axis; the third wrist axis is perpendicular to the second wrist axis; the plurality of motors include a first wrist motor configured to cause the first movable portion to rotate, a second wrist motor configured to cause the second movable portion to rotate, and a third wrist motor configured to cause the third movable portion to rotate; and said two motors are the second wrist motor and the third wrist motor.

According to the above configuration, the distance from the second wrist motor to the second movable portion becomes short, so that the power transmission mechanism for the second movable portion can be simplified, and the distance from the second wrist motor to the third movable portion becomes short, so that the power transmission mechanism for the third movable portion can be simplified.

The multiple-joint industrial robot may be configured such that: the first wrist axis extends in a longitudinal direction of the first movable portion; and an output shaft of the second wrist motor and an output shaft of the third wrist motor extend in a direction perpendicular to the first wrist axis and parallel to the second wrist axis.

According to the above configuration, although the second wrist motor and the third wrist motor are attached to the first movable portion, the size of the first movable portion in the longitudinal direction can be reduced. With this, the wrist portion can be reduced in size as a whole.

The multiple joint industrial robot may be configured such that: the cable insertion portion includes a guide hole, which extends on the first wrist axis and through which the effector cable is inserted; and the guide hole is spreading from a portion of the guide hole toward the end effector, the portion being sandwiched between the second wrist motor and the third wrist motor.

According to the above configuration, while preventing the effector cable from whirling when the second movable portion and the third movable portion are activated, the effector cable can be caused to deform so as to successfully follow the operations of the second movable portion and the third movable portion.

The multiple-joint industrial robot may be configured such that: the cable insertion portion includes a cable guide having a guide hole through which the effector cable is inserted; said two motors are arranged so as to sandwich the cable guide in a direction orthogonal to the first wrist axis; the cable guide is provided at the first movable portion so as to be located on the first wrist axis; a cross-sectional shape of a middle portion of the guide hole is constricted, the middle portion being middle in an axial direction of the first wrist axis; and both end portions of the cross-sectional shape of the guide hole are spreading.

According to the above configuration, the effector cable is inserted through the guide hole of the cable guide located on the first wrist axis that is the rotational center of the first movable portion. Therefore, the effector cable can be suitably prevented from significantly whirling in accordance with the operation of the wrist portion and interfering with peripheral structures outside the robot. An axial middle portion of the guide hole of the cable guide is constricted, and both axial end portions of the guide hole of the cable guide are spreading. Therefore, the effector cable can be prevented from being damaged by getting entangled with the end portion of the cable guide and by wearing by the end portion of the cable guide. Since two motors are arranged so as to sandwich the first movable portion, the cable guide can be easily held by the first movable portion, and a structure configured to attach the cable guide to the first movable portion can be simplified.

The multiple-joint industrial robot may be configured such that: the second wrist axis is perpendicular to the first wrist axis; the middle portion of the guide hole is constricted so as to be narrow in a direction orthogonal to the first wrist axis and the second wrist axis; and the middle portion of the guide hole is long in an extending direction of the second wrist axis.

According to the above configuration, regarding the behavior of the cable, when the second movable portion rotates in a state where the first movable portion or the third movable portion is rotating from the standard posture, and the effector cable is being twisted around the first wrist axis, the effector cable tends to whirl in a direction orthogonal to the first wrist axis. According to the above configuration, even in this case, since the cable guide is long in the above direction, the whirling of the effector cable can be allowed while reducing the size of the cable guide and preventing the damage of the cable guide by the end portion by constricting the middle portion.

The multiple-joint industrial robot may be configured such that: the first movable portion includes a guide attachment wall to which the cable guide is attached; an end portion of the cable guide is attached to the guide attachment wall, the end portion being located at an arm tip side in an axial direction of the first wrist axis; and an end portion of the cable guide is sandwiched between said two motors, the end portion being located at an arm base side in the axial direction of the first wrist axis.

According to the above configuration, an axial arm tip side end portion of the cable guide is attached to the first movable portion, but an axial arm base side end portion thereof is not directly fixed to the first movable portion. Therefore, the cable guide can be easily attached to the first movable portion. The cable guide looks like a cantilever beam, but the axial arm tip side end portion thereof is sandwiched between two motors. On this account, even if the effector cable is pressed against the inner surface of the guide hole, its stress can be received by the motors. Thus, the stress acting on the axial arm tip side end portion of the cable guide and the guide attachment wall is reduced.

The multiple-joint industrial robot may be configured such that: the cable guide is formed by separably joining a first guide half body and a second guide half body; the cable guide is attached to the guide attachment wall so as to be inserted into an attachment hole provided at the guide attachment wall; and in a state where the cable guide is being attached to the guide attachment wall or the cable guide is being pulled out from the attachment hole, a joining portion configured to join the first guide half body to the second guide half body is accessible from an outside of the first movable portion.

According to the above configuration, the cable guide has a half-split structure, and the joining portion is accessible from the outside of the first movable portion. Therefore, in a state where the wrist portion is being coupled to the arm portion, and the effector cable is being provided at the wrist portion, only the cable guide can be detached from and incorporated in the first movable portion.

The multiple joint industrial robot may be configured such that a motor cable through which the electric power and the signals are supplied to said two motors, wherein: the first movable portion includes a substantially cylindrical tubular portion coupled to the arm portion so as to be rotatable; the motor cable is clamped by a fixing clamp fixed to the arm portion and a movable clamp fixed to the first movable portion; the motor cable includes a slack portion located between the fixing clamp and the movable clamp; and the slack portion is arranged along an outer peripheral surface of the tubular portion.

According to the above configuration, when the first movable portion rotates to cause the angular displacement of the movable clamp, the slack portion of the motor cable moves along the outer peripheral surface of the tubular portion. With this, the motor cable can be prevented from wearing as much as possible.

The multiple joint industrial robot may be configured such that: the arm portion includes a substantially cylindrical outer tube portion surrounding the tubular portion; a cable housing space is formed between the outer peripheral surface of the tubular portion and an inner peripheral surface of the outer tube portion; the outer tube portion includes a cable introduction portion through which the motor cable is introduced from an outside of the outer tube portion to an inside of the cable housing space; the motor cable extends from the cable introduction portion through the cable housing space to said two motors; and the slack portion is arranged in the cable housing space.

According to the above configuration, the motor cable can be arranged in the U shape by a simple structure, and the motor cable can be successfully protected by the outer tube portion.

Advantageous Effects of Invention

According to the present invention, the entire configuration of the wrist portion can be reduced in size while routing the effector cable such that smooth operations are not hindered.

DESCRIPTION OF EMBODIMENTS

Hereinafter, an embodiment of the present invention will be explained in reference to the drawings. The same reference signs are used for the same or corresponding components, and a repetition of the same detailed explanation is avoided.

Entire Configuration of Robot

Figure 1:
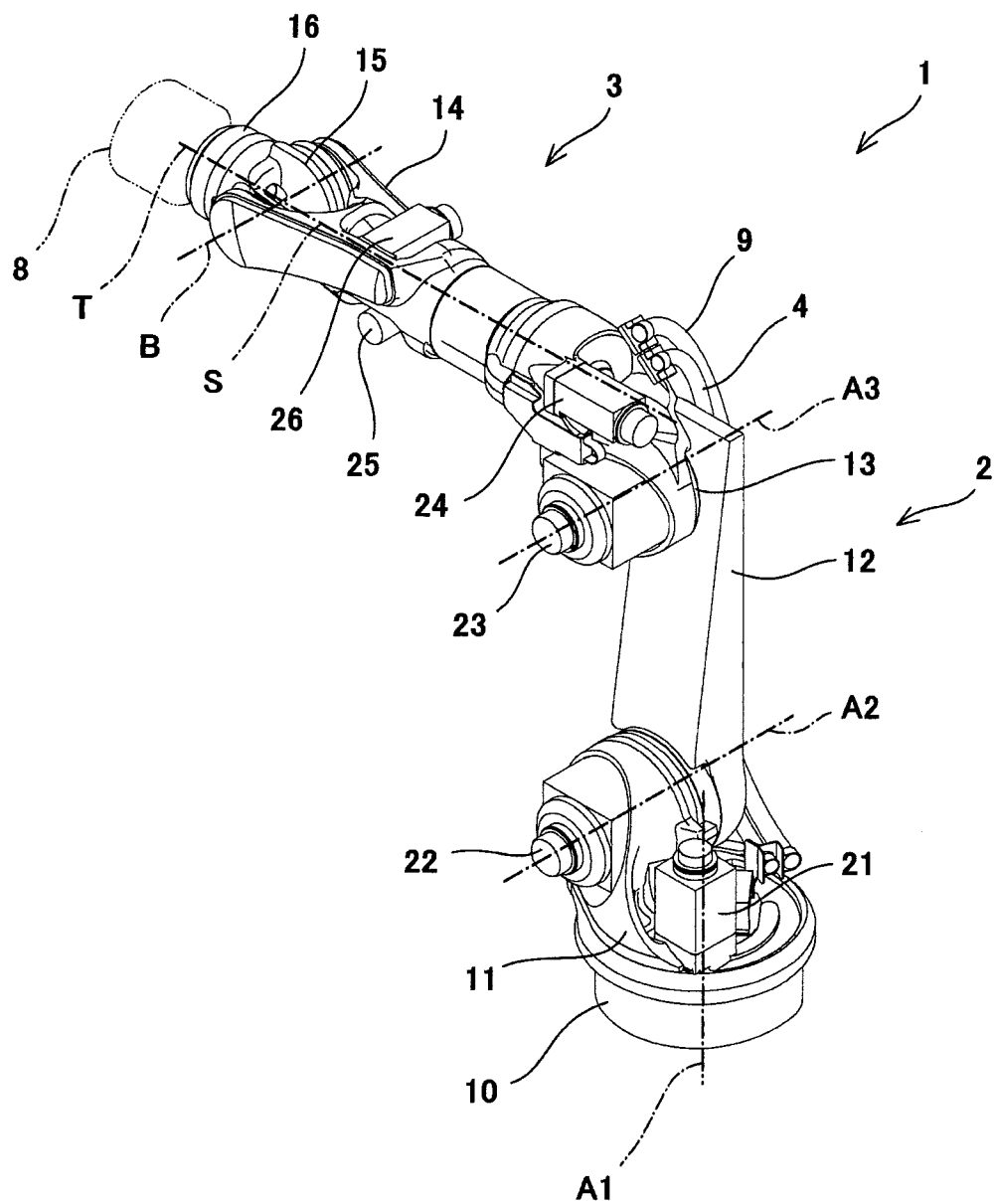
FIG. 1 is a perspective view showing the entire configuration of a robot according to an embodiment of the present invention.

FIG. 1 is a perspective view showing the entire configuration of a multiple-joint robot (hereinafter simply referred to as a "robot") according to the embodiment of the present invention. The robot 1 shown in FIG. 1 is, for example, a vertical multiple joint six-axis robot. The robot 1 includes: a base 10 installed at a working site; an arm portion 2 coupled to the base 10; a wrist portion 3 coupled to a tip end portion of the arm portion 2; a plurality of motors 21 to 26 configured to drive the arm portion 2 and the wrist portion 3; and a motor cable 4 through which power and signals are supplied to the motors.

An end effector 8 for operations is detachably attached to a tip end portion of the wrist portion 3. Various tools and effectors can be used as the end effector 8. Examples of the end effector 8 includes: a spot welding gun configured to perform a spot welding operation; an arc welding torch configured to perform an arc welding operation; a painting gun configured to perform a painting operation; and a holding tool or adsorbing tool configured to perform a picking operation. An effector cable 9 through which at least one of electric power, power, signals, and materials (such as paint or adhesive) is supplied to the attached end effector 8 is attached to the robot 1. In a case where the spot welding gun or the arc welding torch is used as the end effector 8, the effector cable 9 includes a plurality of cables, such as electric cables through which electric power is supplied to the gun or the torch. The effector cable 9 is a bundle of the plurality of cables.

The arm portion 2 includes a base end arm 11, an intermediate arm 12, and a tip end arm 13. The base end arm 11 is coupled to an upper surface side of the base 10 and rotates around a first arm axis A1 relative to the base 10. When the base 10 is appropriately set up on a horizontal surface, the first arm axis A1 extends in a vertical direction. The intermediate arm 12 is formed to be long, and a base end portion thereof is coupled to the base end arm 11. The intermediate arm 12 rotates around a second arm axis A2 relative to the base end arm 11. The second arm axis A2 extends in a direction perpendicular to the first arm axis A1. The tip end arm 13 is coupled to a tip end portion of the intermediate arm 12 and rotates around a third arm axis A3 relative to the intermediate arm 12. The third arm axis A3 extends parallel to the second arm axis A2. The tip end arm 13 constitutes the tip end portion of the arm portion 2, and the wrist portion 3 is coupled to the tip end arm 13.

The wrist portion 3 includes a first movable portion 14, a second movable portion 15, and a third movable portion 16. The first movable portion 14 is formed to be long, and a base end portion thereof is coupled to the tip end arm 13. The first movable portion 14 rotates around a first wrist axis S relative to the tip end arm 13. The second movable portion 15 is coupled to a tip end portion of the first movable portion 14 and rotates around a second wrist axis B relative to the first movable portion 14. The third movable portion 16 is coupled to the second movable portion 15 and rotates around a third wrist axis T relative to the second movable portion 15. The third movable portion 16 constitutes the tip end portion of the wrist portion 3, and the end effector 8 is attached to the third movable portion 16.

The first wrist axis S extends in a direction perpendicular to the third arm axis A3 and in a longitudinal direction of the first movable portion 14. The direction of the first wrist axis S changes depending on a rotational position of the base end arm 11 around the first arm axis A1, a rotational position of the intermediate arm 12 around the second arm axis A2, and a rotational position of the tip end arm 13 around the third arm axis A3. In a case where the direction of the first wrist axis S changes, the postures of the wrist portion 3 and the end effector 8 change.

The second wrist axis B extends in a direction different from the direction of the first wrist axis S. In the present embodiment, the second wrist axis B extends in a direction perpendicular to the first wrist axis S (in other words, in a direction orthogonal to the first wrist axis S). The direction of the second wrist axis B changes depending on the rotational positions of the base end arm 11, the intermediate arm 12, and the tip end arm 13 and a rotational position of the first movable portion 14 around the first wrist axis S. In a case where the direction of the second wrist axis B changes, the postures of the second movable portion 15, the third movable portion 16, and the end effector 8 change.

The third wrist axis T extends in a direction different from the direction of the second wrist axis B. In the present embodiment, the third wrist axis T extends in a direction perpendicular to the second wrist axis B (in other words, in a direction orthogonal to the second wrist axis B). The direction of the third wrist axis T changes depending on the rotational positions of the base end arm 11, the intermediate arm 12, the tip end arm 13, and the first movable portion 14 and a rotational position of the second movable portion 15 around the second wrist axis B. In a case where the direction of the third wrist axis T changes, the postures of the third movable portion 16 and the end effector 8 change.

Hereinafter, the posture of the robot 1 shown in FIG. 1 is referred to as a "standard posture". When the portions 11 to 16 constituting the arm portion 2 and the wrist portion 3 are respectively located at predetermined standard rotational positions, the posture of the robot 1 becomes the standard posture. As shown in FIG. 1, at the time of the standard posture, the three wrist axes S, B, and T extend horizontally, the third wrist axis T is located coaxially with the first wrist axis S, and the second wrist axis B perpendicularly intersects with the first wrist axis S and the third wrist axis T. Each of the portions 11 to 16 can rotate in both a forward direction and an opposite direction from the standard rotational position. By the rotation from the standard rotational position, the posture of the robot 1 changes from the standard posture.

The plurality of motors include: a first arm motor 21 configured to cause the base end arm 11 to rotate around the first arm axis A1; a second arm motor 22 configured to cause the intermediate arm 12 to rotate around the second arm axis A2; and a third arm motor 23 configured to cause the tip end arm 13 to rotate around the third arm axis A3. Further, the plurality of motors include: a first wrist motor 24 configured to cause the first movable portion 14 to rotate around the first wrist axis S; a second wrist motor 25 configured to cause the second movable portion 15 to rotate around the second wrist axis B; and a third wrist motor 26 configured to cause the third movable portion 16 to rotate around the third wrist axis T. These six motors 21 to 26 are, for example, brushless servo motors.

The second and third wrist motors 25 and 26 are attached to the first movable portion 14. The arrangement of the other motors 21 to 24 is not especially limited. In the present embodiment, for example, the third arm motor 23 and the first wrist motor 24 are attached to the tip end arm 13.

When the first to third arm motors 21 to 23 are activated, the end effector 8 rotates around the first to third arm axes A1 to A3 together with the wrist portion 3. When the first wrist motor 24 is activated, the end effector 8 rotates around the first wrist axis S together with the wrist portion 3 so as to swivel relative to the tip end arm 13. When the second wrist motor 25 is activated, the end effector 8 rotates around the second wrist axis B together with the second and third movable portions 15 and 16 so as to bend relative to the first movable portion 14. When the third wrist motor 26 is activated, the end effector 8 rotates around the third wrist axis T together with the third movable portion 16 so as to twist relative to the second movable portion 15. With this, the end effector 8 moves along a desired route while the arm portion 2 and the wrist portion 3 change their postures.

External Structures of Tip End Arm and Wrist Portion

Figure 2A:
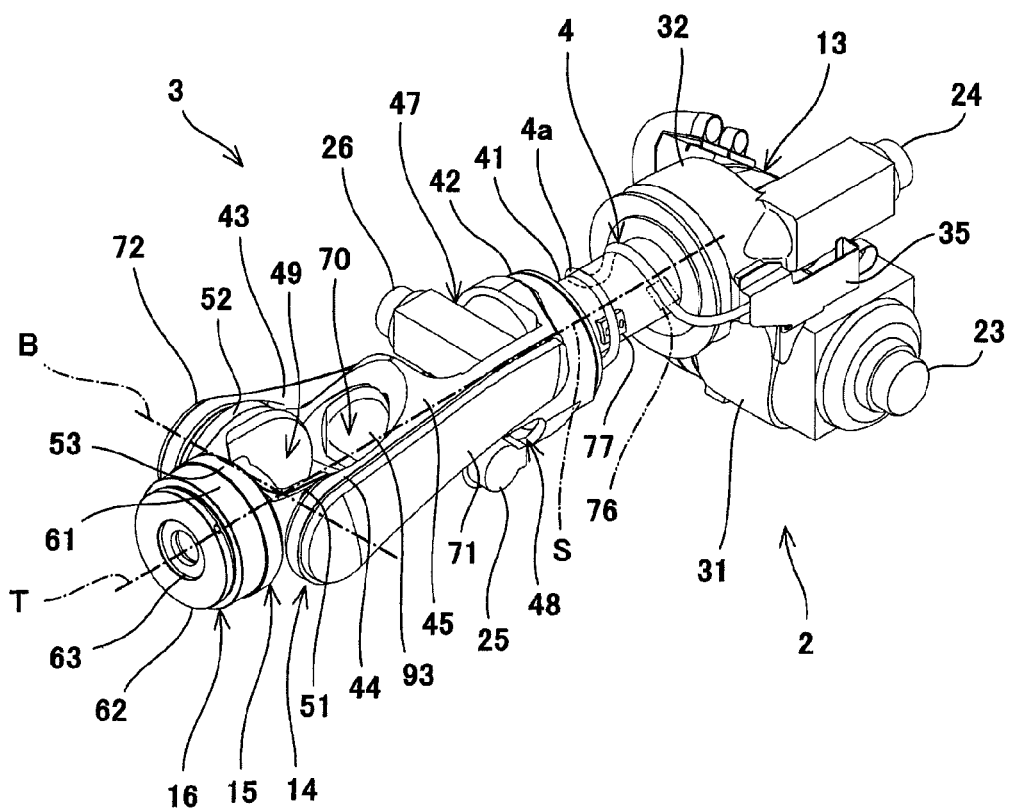
FIG. 2A is a perspective view showing a tip end arm from which an outer tube portion is detached and a wrist portion.
Figure 2B:
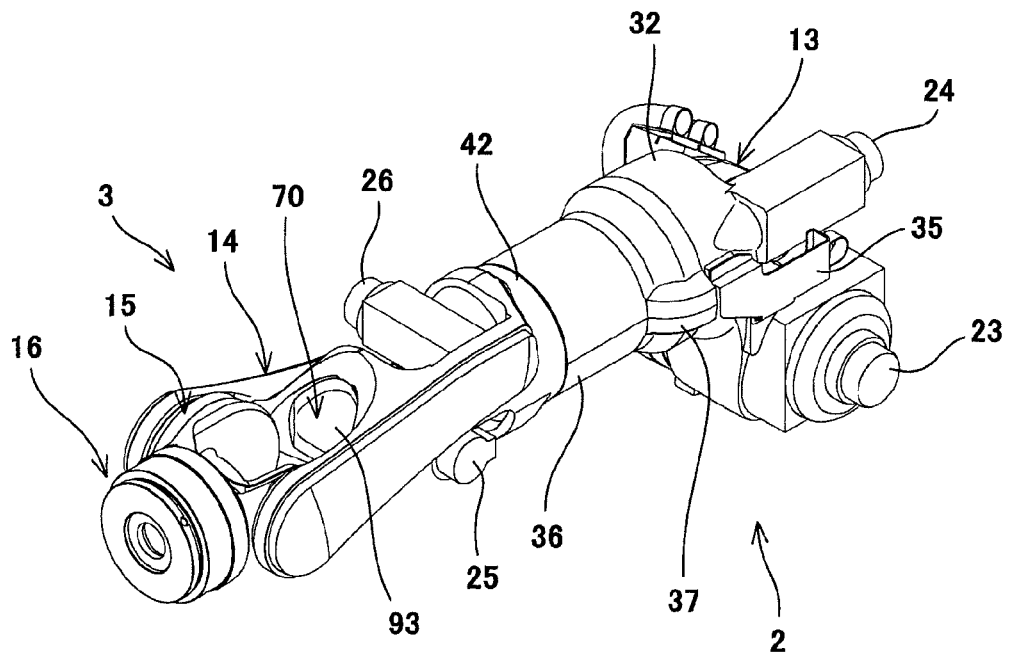
FIG. 2B is a perspective view showing the tip end arm to which the outer tube portion is attached and the wrist portion.

FIG. 2A is a perspective view showing the appearance of the tip end arm 13 from which an outer tube portion 36 is detached and the appearance of the wrist portion 3. FIG. 2B is a perspective view showing the appearance of the tip end arm 13 to which the outer tube portion 36 is attached and the appearance of the wrist portion 3. The posture of the robot 1 shown in each of FIGS. 2A and 2B is the standard posture as with FIG. 1. In FIGS. 2A and 2B, the end effector 8 and the effector cable 9 are not shown. Hereinafter, a side close to the arm portion 2 may be referred to as a "base end side" or a "arm base side", and a side close to the end effector 8 may be referred to as a "tip end side" or a "arm tip side".

As shown in FIG. 2A, the tip end arm 13 includes a motor housing portion 31, a wrist receiving portion 32, and a motor stay portion 33. The third arm motor 23 and the first wrist motor 24 are attached to the tip end arm 13.

The motor housing portion 31 is formed to have a substantially cylindrical shape, both ends of which are open. The third arm motor 23 is housed in the motor housing portion 31 through an opening of the motor housing portion 31. A center axis of the motor housing portion 31 coincides with the third arm axis A3. The wrist receiving portion 32 is formed to have a substantially cylindrical shape, a tip end side of which is open, and a base end side of which is closed. The wrist portion 3 is received by the wrist receiving portion 32 through a circular opening formed at a tip end side of the wrist receiving portion 32. The wrist receiving portion 32 is provided at an outer peripheral side of the motor housing portion 31, and a center axis of the wrist receiving portion 32 extends in a direction perpendicular to the center axis of the motor housing portion 31 and coincides with the first wrist axis S. To be specific, the first wrist axis S is skew to the third arm axis A3.

The motor stay portion 33 is provided at a base end portion of the wrist receiving portion 32. The first wrist motor 24 is attached to the motor stay portion 33 so as to project from the motor stay portion 33 toward the base end side. An output shaft of the first wrist motor 24 is parallel to the center axis of the wrist receiving portion 32. In an extending direction of the first wrist axis S, the motor stay portion 33 is located at the tip end side of the center axis of the motor housing portion 31. Therefore, when viewed from a radial direction of the third arm motor 23, the first wrist motor 24 is arranged so as to partially overlap the third arm motor 23.

As above, since the third arm axis A3 and the first wrist axis S are skew to each other, the structure of the tip end arm 13 is reduced in size in the extending direction of the first wrist axis S. Since the output shaft of the first wrist motor 24 is offset from the first wrist axis S, the first wrist motor 24 can be prevented from interfering with the other parts (especially, the effector cable 9) arranged on the first wrist axis S. Since the output shaft of the first wrist motor 24 is parallel to the first wrist axis S, a parallel shaft type speed reduction mechanism, such as a spur gear train, can be used as a power transmission mechanism 81 (see FIG. 3) configured to reduce the speed of the rotation of the first wrist motor 24 to transmit the rotation to the wrist portion 3. Thus, the entire structure of the tip end arm 13 can be reduced in size and simplified.

The first movable portion 14 includes: a tubular portion 41, a large-diameter tubular portion 42, a pair of first and second beam portions 43 and 44, and a bridge portion 45. The tubular portion 41 is formed to have a hollow cylindrical shape, and a base end portion thereof is received by the wrist receiving portion 32. The large-diameter tubular portion 42 is formed to have a hollow cylindrical shape that is larger in diameter than the tubular portion 41. A base end portion of the large-diameter tubular portion 42 is joined to a tip end portion of the tubular portion 41. The tubular portion 41 is coupled to the tip end arm 13 so as to be rotatable relative to the tip end arm 13, and a center axis of the tubular portion 41 coincides with the center axis of the wrist receiving portion 32. A center axis of the large-diameter tubular portion 42 coincides with the center axis of the tubular portion 41. To be specific, the center axes of the tubular portion 41 and the large-diameter tubular portion 42 coincide with the first wrist axis S. The first beam portion 43 and the second beam portion 44 extend from a tip end portion of the large-diameter tubular portion 42 so as to be substantially parallel to the first wrist axis S and face each other in a direction perpendicular to the first wrist axis S. The second movable portion 15 is sandwiched between a tip end portion of the first beam portion 43 and a tip end portion of the second beam portion 44. The second wrist axis B that is the rotational center of the second movable portion 15 extends in the direction in which the first beam portion 43 and the second beam portion 44 face each other.

The second movable portion 15 includes a pair of first and second flange portions 51 and 52 and a disc portion 53. The disc portion 53 is formed to have an annular shape. The first flange portion 51 and the second flange portion 52 extend from an outer peripheral portion of the disc portion 53 to the base end side so as to be substantially parallel to each other. The first flange portion 51 contacts an inner surface of the first beam portion 43, and the second flange portion 52 contacts an inner surface of the second beam portion 44. As with the first beam portion 43 and the second beam portion 44, the first flange portion 51 and the second flange portion 52 face each other in an extending direction of the second wrist axis B. A center axis of the disc portion 53 coincides with the third wrist axis T. The first flange portion 51, the second flange portion 52, and the disc portion 53 form a substantially U shape when viewed from a direction (vertical direction at the time of the standard posture) perpendicular to the second wrist axis B and the third wrist axis T.

The third movable portion 16 includes a base portion 61 and an attachment portion 62. The base portion 61 is formed to have a cylindrical shape having a diameter that is substantially the same as an outer diameter of the disc portion 53 and is coupled to a tip end portion of the disc portion 53. The attachment portion 62 is formed to have a disc shape and joined to the base portion 61. The end effector 8 is attached and fixed to a circular tip end surface of the attachment portion 62. A center axis of the base portion 61 and a center axis of the attachment portion 62 coincide with the center axis of the disc portion 53, that is, the third wrist axis T. The attachment portion 62 includes a through hole 63 located on the third wrist axis T.

The bridge portion 45 of the first movable portion 14 connects between longitudinally intermediate portions of the first and second beam portions 43 and 44. Therefore, the first beam portion 43, the second beam portion 44, and the bridge portion 45 form a substantially H shape when viewed from a direction (vertical direction at the time of the standard posture) perpendicular to both the first wrist axis S and the second wrist axis B. By the bridge portion 45, the strength of the first movable portion 14 increases, and the first movable portion 14 can successfully support the second movable portion 15, the third movable portion 16, and the end effector 8.

Cable Insertion Portion and Second and Third Wrist Motors

By the bridge portion 45, the first movable portion 14 includes a base end space that is located at the base end side of the bridge portion 45 and surrounded by the large-diameter tubular portion 42, the first beam portion 43, and the second beam portion 44. The first movable portion 14 also includes a tip end space 49 that is located at the tip end side of the bridge portion 45 and surrounded by the first beam portion 43, the second beam portion 44, and the second movable portion 15.

A cable insertion portion 70 through which the effector cable 9 (see FIGS. 1, 3, and 4) is inserted is provided at the tip end arm 13 and the wrist portion 3. At the tip end arm 13 and the first movable portion 14, the cable insertion portion 70 is provided so as to be located on the first wrist axis S, and at the third movable portion 16, the cable insertion portion 70 is provided so as to be located on the third wrist axis T. At the first movable portion 14, the cable insertion portion 70 is provided at the inside of the tubular portion 41, the inside of the large-diameter tubular portion 42, the base end space, the bridge portion 45, and the tip end space 49 along the longitudinal direction of the first movable portion 14. The tip end space 49 of the cable insertion portion 70 is continuous with a gap between the first flange portion 51 and the second flange portion 52, the inside of the disc portion 53, and the through hole 63.

By the cable insertion portion 70 located on the first wrist axis S, the base end space is divided into two spaces in a direction (vertical direction at the time of the standard posture) perpendicular to the first wrist axis S and the second wrist axis B. Between the two spaces of the base end space, one located at an upper side in the vertical direction at the time of the standard posture is referred to as a first base end space 47, and the other located at a lower side in the vertical direction at the time of the standard posture is referred to as a second base end space 48. The third wrist motor 26 is provided in the first base end space 47, and the second wrist motor 25 is provided in the second base end space 48. As above, the second wrist motor 25 and the third wrist motor 26 are attached to the first wrist portion 14 so as to overlap each other in a direction perpendicular to the first wrist axis S and sandwich the cable insertion portion 70 in this direction.

The effector cable 9 is inserted through the cable insertion portion 70 located on the first wrist axis S that is a rotational center of the first movable portion 14. Therefore, the effector cable 9 can be successfully prevented from significantly whirling in accordance with the operation of the wrist portion 3 and interfering with structures or works around a work space. Since the second wrist motor 25 and the third wrist motor 26 are attached to the first movable portion 14 so as to sandwich the cable insertion portion 70, the weight balance of the first movable portion 14 when the first movable portion 14 rotates can be kept. A more detailed configuration of the cable insertion portion 70 will be described below together with an explanation of internal structures of the tip end arm 13 and wrist portion 3.

The second wrist motor 25 and the third wrist motor 26 are arranged such that respective output shafts thereof extend in a direction (horizontal direction at the time of the standard posture) perpendicular to the first wrist axis S and parallel to the second wrist axis B. In other words, the second wrist motor 25 and the third wrist motor 26 are arranged such that the respective output shafts thereof extend in a direction perpendicular to the longitudinal direction of the first movable portion 14. Therefore, the size of the first movable portion 14 in the longitudinal direction can be reduced while attaching the second wrist motor 25 and the third wrist motor 26 to the first movable portion 14.

A base end portion of the first beam portion 43 and a base end portion of the second beam portion 44 are different in position from each other in a direction (vertical direction at the time of the standard posture) perpendicular to both the first wrist axis S and the second wrist axis B. The base end portion of the first beam portion 43 is arranged at the first base end space 47 side (upper side at the time of the standard posture) of the first wrist axis S, and the base end portion of the second beam portion 44 is arranged at the second base end space 48 side (lower side at the time of the standard posture) of the first wrist axis S. This structure is realized in a case where, for example, the first beam portion 43 and the second beam portion 44 are arranged so as to be 180° rotational symmetry around the first wrist axis S.

In this case, one side of the first base end space 47 in a direction parallel to the second wrist axis B is covered with the first beam portion 43 whereas the other side thereof is open without being covered with the second beam portion 44. Therefore, in a case where the third wrist motor 26 is arranged in the first base end space 47 such that the output shaft thereof extends in a direction parallel to the second wrist axis B, a housing of the third wrist motor 26 can be arranged so as to project to the other side of the inner surface of the second beam portion 44. In other words, a distance between the first beam portion 43 and the second beam portion 44 can be made shorter than each of axial sizes of the output shafts of the wrist motors 25 and 26. The same is true for the relationship among the second base end space 48, the first beam portion 43, the second beam portion 44, and the second wrist motor 25. Therefore, the size of the first movable portion 14 in a direction of the second wrist axis B can be shortened while attaching the second and third wrist motors 25 and 26 to the first movable portion 14 such that the size of the first movable portion 14 in the longitudinal direction is shortened. The space 47 in which the motor 26 is arranged is open at one of sides in the axial direction of the output shaft of the motor 26, and the space 48 in which the motor 25 is arranged is open at one of sides in the axial direction of the output shaft of the motor 25. Therefore, the second wrist motor 25 and the third wrist motor 26 can be easily attached to and detached from the first wrist portion 14, and the second wrist motor 25 and the third wrist motor 26 can be easily assembled and maintained.

The output shaft of the second wrist motor 25 is arranged parallel to the second wrist axis B. Therefore, the rotation of the second wrist motor 25 can be transmitted to the second movable portion 15 without changing the direction of the rotation axis. On this account, a power transmission mechanism 82 (see FIG. 3) configured to transmit power from the second wrist motor 25 to the second movable portion 15 can be simplified. The output shaft of the third wrist motor 26 is arranged in a direction perpendicular to the third wrist axis S. Therefore, a power transmission mechanism 83 (see FIG. 3) configured to transmit power from the third wrist motor 26 to the third movable portion 16 may include a mechanism configured to change the direction of the rotation axis by 90°. Since the second wrist motor 25 and the third wrist motor 26 are attached to the first movable portion 14, the power transmission mechanisms 82 and 83 (see FIG. 3) can be made smaller than a case where the second wrist motor 25 and the third wrist motor 26 are attached to the portion 10, 11, 12, or 13 constituting the arm portion 2, for example, to the tip end arm 13.

The first base end space 47 is covered with the first beam portion 43, and the second base end space 48 is covered with the second beam portion 44. The first beam portion 43 is covered with a first side cover 71, and the second beam portion 44 is covered with a second side cover 72. The third wrist motor 26 is attached to the inner surface of the first beam portion 43, and the output shaft of the third wrist motor 26 is arranged in a first side space 73 (see FIG. 3) surrounded by the first beam portion 43 and the first side cover 71. The power transmission mechanism 83 (see FIG. 3) configured to transmit the rotation of the third wrist motor 26 to the third wrist axis T is housed in the first side space 73. The second wrist motor 25 is attached to the inner surface of the second beam portion 44, and the output shaft of the second wrist motor 25 is arranged in a second side space 74 (see FIG. 3) surrounded by the second beam portion 44 and the second side cover 72. The power transmission mechanism 82 (see FIG. 3) configured to transmit the rotation of the second wrist motor 25 to the second wrist axis B is housed in the second side space 74 (see FIG. 3).

As above, a pair of first and second beam portions 43 and 44 serve not only as frame members of the first movable portion 14 but also as stays to which the second wrist motor 25 and the third wrist motor 26 are attached and as housing members configured to individually house the power transmission mechanisms 82 and 83. With this, these two power transmission mechanisms 82 and 83 are arranged so as to be spaced apart from each other in a direction perpendicular to the first wrist axis S and sandwich the first wrist axis S in the direction perpendicular to the first wrist axis S. Therefore, the weight balance of the first movable portion 14 when the first movable portion 14 rotates can be kept. Further, by detaching the first side cover 71, the power transmission mechanism 83 corresponding to the third wrist motor 26 can be maintained, and by detaching the second side cover 72, the power transmission mechanism 82 corresponding to the second wrist motor 25 can be maintained. As above, when maintaining one of the power transmission mechanisms, the other does not hinder. Therefore, the maintenance of the robot 1 can be easily performed.

Motor Cable

The second wrist motor 25 and the third wrist motor 26 are arranged at the tip end side of the tubular portion 41 and located at a substantially longitudinally middle portion of the first wrist portion 14. The motor cable 4 through which electric power and the like are supplied to the second wrist motor 25 and the third wrist motor 26 extends from the base 10 (see FIG. 1). Therefore, the motor cable 4 extends sequentially through the tip end arm 13 and the base end portion of the first wrist portion 14 (that is, the tubular portion 41 and the large-diameter tubular portion 42) to be connected to the second wrist motor 25 and the third wrist motor 26. The first wrist portion 14 can rotate relative to the tip end arm 13. Therefore, the motor cable 4 is routed using a so-called U-shaped arrangement around the base end portion of the first wrist portion 14 so as not to break even when the first wrist portion 14 rotates relatively.

The tip end arm 13 includes a cable pull-out portion 35 which is located on an outer peripheral surface of the wrist receiving portion 32 and from which the motor cable 4 is pulled out from the inside of the tip end arm 13 to the outside. The cable pull-out portion 35 includes an opening from which the motor cable 4 is pulled out to the outside, and this opening faces the tip end side in the extending direction of the first wrist axis S. Therefore, the motor cable 4 is pulled out from the cable pull-out portion 35 to the tip end side in the extending direction of the first wrist axis S.

The motor cable 4 is clamped by a fixing clamp 76 and a movable clamp 77. The motor cable 4 between the fixing clamp 76 and the movable clamp 77 extends along an outer peripheral surface of the tubular portion 41. The fixing clamp 76 is fixed to the tip end arm 13 and is arranged close to and opposed to the outer peripheral surface of the tubular portion 41. The movable clamp 77 is fixed to the tubular portion 41 and is arranged on the outer peripheral surface of the tubular portion 41. The fixing clamp 76 and the movable clamp 77 are arranged so as to be spaced apart from each other in the extending direction of the first wrist axis S.

The motor cable 4 includes a slack portion 4a located between the fixing clamp 76 and the movable clamp 77. The slack portion 4a is longer than a shortest distance between the fixing clamp 76 and the movable clamp 77. Therefore, the slack portion 4a may extend so as to trace out a substantially U shape on the outer peripheral surface of the tubular portion 41. The slack portion 4a extends along the outer peripheral surface of the tubular portion 41. At the tip end side of the movable clamp 77, the motor cable 4 extends inside or outside the large-diameter tubular portion 42 along the first wrist axis S. The motor cable 4 is finally connected to the second wrist motor 25 and the third wrist motor 26.

When the first movable portion 14 rotates relative to the tip end arm 13, the position of the fixing clamp 76 does not change, but the position of the movable clamp 77 is rotationally displaced around the first wrist axis S. With this, the distance between the fixing clamp 76 and the movable clamp 77 changes. The motor cable 4 includes the slack portion 4a between the fixing clamp 76 and the movable clamp 77, and when the distance between the fixing clamp 76 and the movable clamp 77 increases, the slack of the slack portion 4a decreases. By this decrease of the slack, the application of an excessive tension to the motor cable 4 can be avoided, and the breaking of the motor cable 4 can be successfully prevented. As the distance between the fixing clamp 76 and the movable clamp 77 decreases, the slack of the slack portion 4a increases. By the slack portion 4a, the posture of the motor cable 4 relative to the tip end arm 13 at the base end side of the fixing clamp 76 changes little regardless of the first movable portion 14, and the posture of the motor cable 4 relative to the first movable portion 14 at the tip end side of the movable clamp 77 changes little regardless of the first movable portion 14. Therefore, the motor cable 4 does not get entangled with the tip end arm 13 or the first movable portion 14.

If the slack portion 4a is arranged along the outer peripheral surface of the tip end arm 13 that is a fixed side or along the outer peripheral surface of a member fixed to the tip end arm 13, the slack portion 4a slides on the outer peripheral surface at the time of the rotation of the first movable portion 14, so that the motor cable 4 may be damaged by wear. However, according to the present embodiment, the slack portion 4a is arranged along the outer peripheral surface of the first movable portion 14 that is a movable side. Therefore, when the first movable portion 14 rotates, the slack portion 4a rotates together with the first movable portion 14 to decrease or increase its slack. Therefore, the sliding of the slack portion 4a and the damage of the motor cable 4 by the sliding can be successfully prevented.

The fixing clamp 76 is arranged close to a base end portion of the outer peripheral surface of the tubular portion 41, and the movable clamp 77 is arranged on a tip end portion of the outer peripheral surface of the tubular portion 41. With this, the distance between these two clamps 76 and 77 in the direction of the first wrist axis S is increased as much as possible. Therefore, the length of the slack portion 4a can be increased as much as possible. On this account, even if the amount of rotational displacement of the first movable portion 14 is large, the application of the excessive tension to the motor cable 4 can be avoided. At the time of the standard posture, the fixing clamp 76 and the movable clamp 77 are arranged so as to be lined up in the direction of the first wrist axis S. To be specific, at the time of the standard posture, the phase of the fixing clamp 76 around the first wrist axis S substantially coincide with that of the movable clamp 77. At the time of the standard posture, the slack portion 4a extends on the outer peripheral surface of the tubular portion 41 so as to trace out a substantially U shape. Therefore, even if the first movable portion 14 rotates in the forward direction or the opposite direction from the standard rotational position, the application of the excessive tension to the motor cable 4 can be avoided.

The tubular portion 41 is smaller in diameter than each of the wrist receiving portion 32 and the large-diameter tubular portion 42. Therefore, the wrist receiving portion 32, the tubular portion 41, and the large-diameter tubular portion 42 form a dumbbell-shaped stepped cylindrical shape as a whole. As shown in FIG. 2B, the outer tube portion 36 having a substantially cylindrical shape and surrounding the tubular portion 41 is attached to the tip end arm 13. Both end portions of the outer tube portion 36 are open. A base end portion of the outer tube portion 36 is supported by a tip end side outer peripheral surface of the wrist receiving portion 32, and a tip end portion thereof is supported by a base end side outer peripheral surface of the large-diameter tubular portion 42.

A cable introduction portion 37 is provided at a base end portion of the outer tube portion 36 so as to project toward a radially outer peripheral side of the outer tube portion 36. When the outer tube portion 36 is supported by the wrist receiving portion 32 and the large-diameter tubular portion 42, the cable introduction portion 37 is connected to the cable pull-out portion 35 of the tip end arm 13. The cable introduction portion 37 opens on an inner peripheral surface of the outer tube portion 36. A closed cable housing space 78 (see FIG. 3) is formed between the inner peripheral surface of the outer tube portion 36 and the outer peripheral surface of the tubular portion 41 so as to have a substantially annular shape. The fixing clamp 76 is provided on the inner peripheral surface of the outer tube portion 36 forming the cable housing space 78 and is arranged close to the outer peripheral surface of the tubular portion 41 as described above. The movable clamp 77 is also housed in the cable housing space 78.

The motor cable 4 is introduced from the cable pull-out portion 35 of the tip end arm 13 through the cable introduction portion 37 to the inside of the cable housing space 78 to be clamped by the fixing clamp 76. The slack portion 4a is arranged in the cable housing space 78 and surrounded by the outer tube portion 36. Therefore, the motor cable 4 extends from the arm portion 2 side to the second and third wrist motors 25 and 26 without being exposed to the outside. As above, by the outer tube portion 36, not only the effector cable 9 but also the motor cable 4 can be successfully protected from external structures of the robot 1 while realizing a structure in which the motor cable 4 is provided using the U-shaped arrangement on the outer peripheral surface of the tubular portion 41 that is the movable side.

As described above, the effector cable 9 is provided along the first wrist axis S in the first wrist portion 14. Therefore, a space through which the effector cable 9 is inserted and a space in which the slack portion 4a of the motor cable 4 is arranged are defined by a peripheral wall of the tubular portion 41 in a direction orthogonal to the first wrist axis S. If the effector cable 9 is a cable for a spot welding gun, the effector cable 9 is typically larger in diameter than the motor cable 4. Therefore, as compared to the motor cable 4, the effector cable 9 does not easily break when twisted. In the present embodiment, among these two spaces defined by the peripheral wall of the tubular portion 41, the effector cable 9 is route in one space at a center side, and the motor cable 4 is routed in the other space at an outer peripheral side using the U-shaped arrangement. With this, the breaking of the motor cable 4 can be successfully prevented, and the slack of the effector cable 9 can be reduced. If the slack of the effector cable 9 is reduced, the entire length of the effector cable 9 decreases, and the weight of the effector cable 9 decreases.

Internal Structures of Tip End Arm and Wrist Portion

Figure 3:
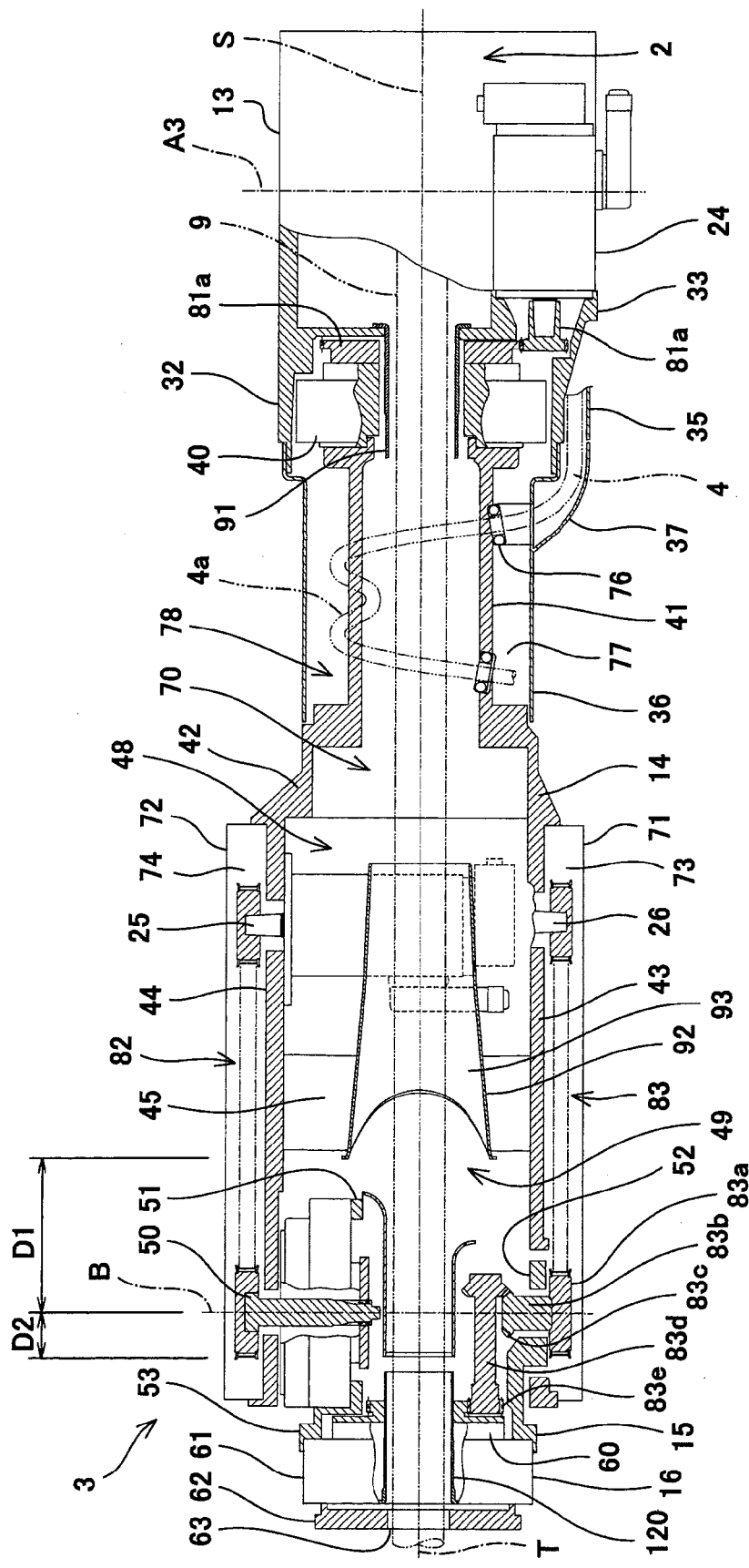
FIG. 3 is a cross-sectional diagram of the tip end arm and the wrist portion.
Figure 4:
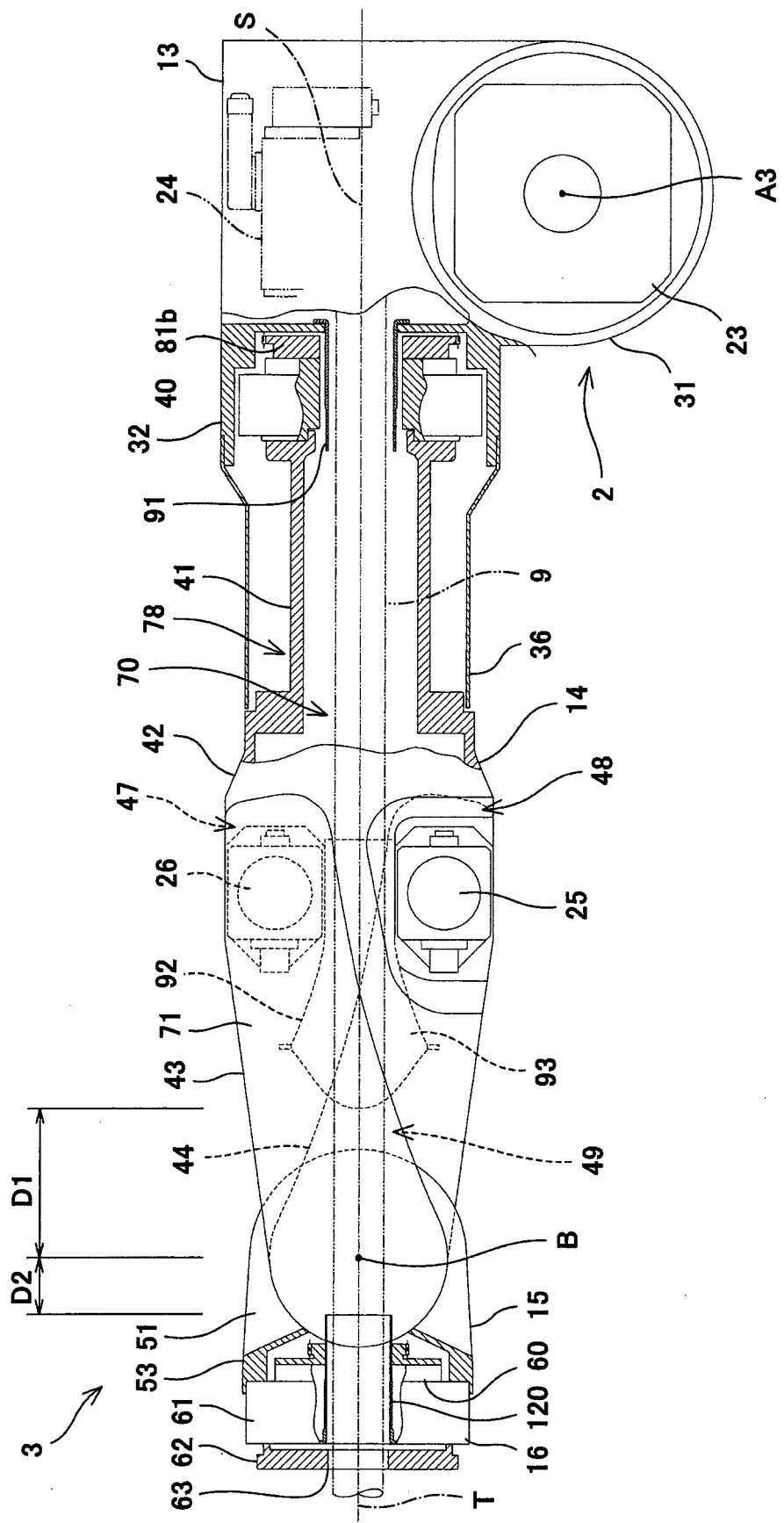
FIG. 4 is a cross-sectional diagram of the tip end arm and the wrist portion.

FIGS. 3 and 4 are cross-sectional diagrams of the tip end arm 13 and the wrist portion 3 at the time of the standard posture. In FIG. 3, three wrist axes S, B, and T extend on a cross section shown therein. In FIG. 4, the first wrist axis S and the third wrist axis T extend on a cross section shown therein, but the second wrist axis B is orthogonal to the cross section. In FIGS. 3 and 4, the end effector 8 is omitted.

Introduction of Effector Cable

As shown in FIG. 3, the first power transmission mechanism 81 configured to transmit the rotation of the first wrist motor 24 to the wrist portion 3 is housed in the tip end arm 13. A cylindrical pipe 91 is provided at a middle portion of the wrist receiving portion 32. A center axis of the cylindrical pipe 91 is located on the center axis of the wrist receiving portion 32. The cylindrical pipe 91 does not rotate based on the operation of the first wrist motor 24.

A swivel shaft 40 to which the rotation of the first wrist motor 24 is input is provided at the base end side of the wrist portion 3. The swivel shaft 40 is externally fitted to the cylindrical pipe 91, is arranged concentrically with the cylindrical pipe 91, and can rotate relative to the cylindrical pipe 91. The first power transmission mechanism 81 includes a driving gear 81a configured to rotate integrally with the output shaft of the first wrist motor 24 and a driven gear 81b configured to mesh with the driving gear 81a. The driven gear 81b is arranged concentrically with the swivel shaft 40 and joined to the swivel shaft 40. The driving gear 81a and the driven gear 81b are spur gears, and the driven gear 81b is larger in diameter than the driving gear 81a. When the first wrist motor 24 is activated, the rotation of the output shaft of the first wrist motor 24 is decelerated by the first power transmission mechanism 81 to be transmitted to the swivel shaft 40. With this, the wrist portion 3 rotates around a center axis of the swivel shaft 40.

The center axis of the swivel shaft 40 corresponds to the first wrist axis S. Each of the center axis of the wrist receiving portion 32, the center axis of the cylindrical pipe 91, the center axis of the tubular portion 41, and the center axis of the large-diameter tubular portion 42 is arranged so as to coincide with the center axis of the swivel shaft 40.

The effector cable 9 is introduced from the outside of the tip end arm 13 to the inside of the wrist receiving portion 32. As described above, the first wrist motor 24 is attached to the base end side of the wrist receiving portion 32. The first wrist motor 24 is arranged so as to be offset from the first wrist axis S and is arranged parallel to the first wrist axis S. In the present embodiment, the output shaft of the first wrist motor 24 is arranged so as to be away from the first wrist axis S toward one side in the extending direction of the third arm axis A3. Therefore, at the base end side of the wrist receiving portion 32, a space is secured at the other side in the extending direction of the third arm axis A3 when viewed from the first wrist axis S. By effectively utilizing this space, the effector cable 9 is introduced to the inside of the wrist receiving portion 32 at a position away from the first wrist axis S toward the other side in the extending direction of the third arm axis A3 (see FIG. 1).

As above, since the first wrist motor 24 is arranged so as to be offset from the first wrist axis S, the first power transmission mechanism 81 can be realized by a simple structure, the space to which the effector cable 9 is introduced can be secured, and the interference of the introduced effector cable 9 with the first power transmission mechanism 81 can be successfully prevented. Although the first wrist motor 24 is offset from the first wrist axis S, the effector cable 9 serves as a counter weight, so that the weight balance of the tip end arm 13 in the direction of the third arm axis A3 is kept.

Cable Insertion Portion (from Tip End Arm to Large-Diameter Tubular Portion)

Both ends of the cylindrical pipe 91 are open. The opening of the base end side of the cylindrical pipe 91 is located inside the tip end arm 13. The base end portion of the tubular portion 41 is externally fitted to the tip end portion of the cylindrical pipe 91. Therefore, the opening of the tip end side of the cylindrical pipe 91 closely communicates with an internal space of the tubular portion 41, and the tubular portion 41 is larger in an inner diameter than the cylindrical pipe 91. The internal space of the tubular portion 41 communicates with an internal space of the large-diameter tubular portion 42. The large-diameter tubular portion 42 is larger in an inner diameter than the tubular portion 41.

The effector cable 9 is introduced to the inside of the wrist receiving portion 32 at the base end side of the cylindrical pipe 91 to be introduced through the opening of the base end side of the cylindrical pipe 91 to the inside of the cylindrical pipe 91. Since the effector cable 9 is introduced at the base end side of the cylindrical pipe 91, the effector cable 9 can be introduced to the inside of the cylindrical pipe 91 without forcibly bending the effector cable 9 inside the tip end arm 13. After the effector cable 9 extends through the inside of the cylindrical pipe 91, the effector cable 9 is sequentially introduced to the internal space of the tubular portion 41 and the internal space of the large-diameter tubular portion 42. As above, the effector cable 9 is attached to the wrist portion 3 so as to extend along the first wrist axis S. The effector cable 9 is introduced to the inside of the cylindrical pipe 91 that is the fixed side before being introduced to the inside of the wrist portion 3. Therefore, the whirling of the effector cable 9 inside the wrist portion 3 that is the movable side can be successfully prevented when the wrist portion 3 is activated.

Cable Insertion Portion (from Large-Diameter Tubular Portion to Guide Hole)

Next, the effector cable 9 extends along the first wrist axis S through the base end space, the bridge portion 45, and the tip end space 49. The bridge portion 45 includes a through hole 45a (see FIG. 9) extending in the extending direction of the first wrist axis S. The through hole 45a has a substantially circular cross section, and a center axis of the through hole is located on the first wrist axis S.

Figure 9:
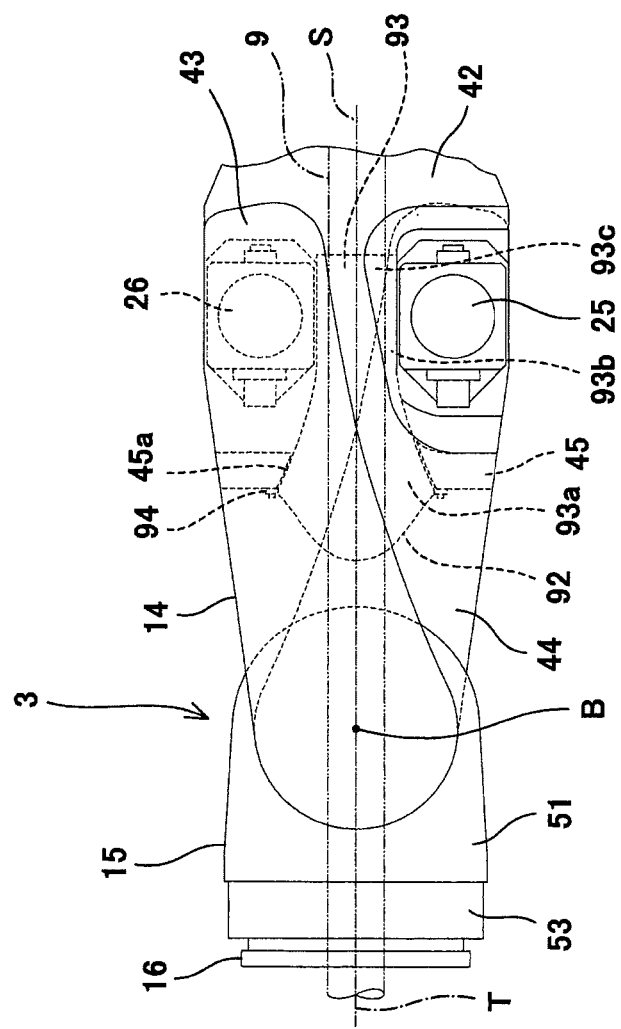
FIG. 9 is a cross-sectional diagram showing the wrist portion of FIG. 1 in a side view.

A cable guide 92 is inserted into the through hole 45a (see FIG. 9). The cable guide 92 is formed to have a trumpet shape as a whole. More specifically, the cable guide 92 is formed to have a tubular shape, both ends of which are open, and includes a guide hole 93 therein. A detailed structure and position of the cable guide 92 and operational advantages obtained by the detailed structure and position will be described below.

A center axis of the guide hole 93 coincides with the first wrist axis S, and a tip end side of the guide hole 93 communicates with the tip end space 49. A base end portion of the cable guide 92 projects from the bridge portion 45 into the base end space. The opening of the base end side of the cable guide 92 is located in the internal space of the large-diameter tubular portion 42, and the base end side of the guide hole 93 communicates with the internal space of the large-diameter tubular portion 42.

After the effector cable 9 is introduced to the internal space of the large-diameter tubular portion 42, the effector cable 9 introduced through the opening of the base end side of the cable guide 92 to the guide hole 93. After the effector cable 9 extends through the guide hole 93, the effector cable 9 is introduced through the opening of the tip end side of the cable guide 92 to the tip end space 49. Thus, the cable guide 92 and the guide hole 93 constitute the cable insertion portion 70, which is provided at the first movable portion 14 so as to be located on the first wrist axis S, and through which the effector cable 9 is inserted.

Cable Insertion Portion (from Guide Hole to Third Movable Portion)

The tip end portion of the guide hole 93 more significantly increases in diameter than the base end portion thereof as the guide hole 93 extends toward the tip end side. Especially, the guide hole 93 is spreading toward the tip end side from a portion sandwiched between the second wrist motor 25 and the third wrist motor 26. At the portion sandwiched between the second wrist motor 25 and the third wrist motor 26, the guide hole 93 is long in the extending direction of the second wrist axis B, and at the tip end side of this portion, the rate of increase in size in a direction perpendicular to the first wrist axis S and the second wrist axis B is higher than the rate of increase in size in the extending direction of the second wrist axis B. On this account, the guide hole 93 has a substantially perfect circular cross section at the tip end portion.

Herein, the internal structures of the second movable portion 15 and third movable portion 16 will be simply explained. A projecting length of the second flange portion 52 from the disc portion 53 is larger than a projecting length of the first flange portion 51 from the disc portion 53. A bend shaft 50 to which the rotation of the second wrist motor 25 is input is provided in the second flange portion 52. When the rotation of the second wrist motor 25 is input to the bend shaft 50, the bend shaft 50 rotates around its own center axis. The center axis of the bend shaft 50 is the second wrist axis B. When the bend shaft 50 rotates, the entire second movable portion 15, the third movable portion 16, and the end effector 8 rotate around the second wrist axis B. The first flange portion 51 is supported by the first beam portion 43 so as to be rotatable. Therefore, even if the bend shaft 50 is eccentrically located in the extending direction of the second wrist axis B, the entire second movable portion 15 smoothly rotates. The second power transmission mechanism 82 is constituted by, for example, a belt transmission mechanism provided between the output shaft of the second wrist motor 25 and the bend shaft 50. As described above, the axial direction of the output shaft of the second wrist motor 25 is parallel to the second wrist axis B. Therefore, only by a single belt transmission mechanism, the rotation of the second wrist motor 25 can be transmitted to the bend shaft 50 and the second movable portion 15.

A cylindrical pipe 120 is inserted into a middle portion of the disc portion 53 of the second movable portion 15 and a middle portion of the base portion 61 of the third movable portion 16. The cylindrical pipe 120 is fixed to the third movable portion 16, and the second movable portion 15 is rotatable relative to the cylindrical pipe 120. A twist shaft 60 to which the rotation of the third wrist motor 26 is input is provided in the disc portion 53. The twist shaft 60 is externally fitted to the cylindrical pipe 120, is arranged concentrically with the cylindrical pipe 120, and can rotate relative to the cylindrical pipe 120. The twist shaft 60 is joined to the base portion 61 of the third movable portion 16. When the rotation of the third wrist motor 26 is input to the twist shaft 60, the twist shaft 60 rotates around its own center axis, and in accordance with this rotation, the third movable portion 16 and the end effector 8 rotate around a center axis of the twist shaft 60. The center axis of the twist shaft 60 is the third wrist axis T.

The third power transmission mechanism 83 includes a belt transmission mechanism 83a, a primary shaft 83b, a bevel gear train 83c, a secondary shaft 83d, and a spur gear train 83e. The primary shaft 83b extends parallel to the extending direction of the second wrist axis B (that is, the axial direction of the output shaft of the third wrist motor 26) and is arranged in the first side space 73 and the first flange portion 51. The secondary shaft 83d extends parallel to the extending direction of the third wrist axis T (that is, the direction of the center axis of the twist shaft 60) and is arranged in the first flange portion 51 and the disc portion 53. The secondary shaft 83d is arranged in the disc portion 53 so as to be located at the outer peripheral side of the cylindrical pipe 120 and the twist shaft 60. The belt transmission mechanism 83a is housed in the first side space 73, and transmits the rotation of the output shaft of the third wrist motor 26 to the primary shaft 83b. The bevel gear train 83c is housed in the first flange portion 51 and transmits the rotation of the primary shaft 83b to the secondary shaft 83d. The spur gear train 83e is housed in the disc portion 53 and transmits the rotation of the secondary shaft 83d to the twist shaft 60.

Both ends of the cylindrical pipe 120 are open. The opening of the base end side of the cylindrical pipe 120 is located between the first flange portion 51 and the second flange portion 52. The opening of the tip end side of the cylindrical pipe 120 communicates with the through hole 63 of the attachment portion 62 of the third movable portion 16.

The effector cable 9 comes out from the guide hole 93, is introduced to the tip end space 49, and then extends through a space between the first flange portion 51 and the second flange portion 52. Next, the effector cable 9 is introduced through the opening of the base end side of the cylindrical pipe 120 sequentially to the cylindrical pipe 120 and the through hole 63. After the effector cable 9 extends through the cylindrical pipe 120 and the through hole 63, the effector cable 9 is pulled out from the through hole 63 to be connected to the end effector 8. Thus, after the effector cable 9 comes out from the guide hole 93, the effector cable 9 extends along the third wrist axis T.

At the time of the standard posture, the first wrist axis S and the third wrist axis T are located on the same straight line. Therefore, at the time of the standard posture, the effector cable 9 is in a steady state and extends linearly along the first wrist axis S and the third wrist axis T from the guide hole 93 to the through hole 63. Thus, the effector cable 9 extends through a center portion of the guide hole 93.

When the first movable portion 14 and/or the third movable portion 16 rotate from the standard posture, the effector cable 9 maintains its linearly extending state and is twisted by the rotation of the first movable portion 14 and/or the third movable portion 16. When only the second movable portion 15 rotates from the standard posture, the third wrist axis T inclines relative to the first wrist axis S. With this, the effector cable 9 bends around a position where the second wrist axis B extends.

Here, a distance in the extending direction of the first wrist axis S from the opening of the tip end side of the cable guide 92 to a position where the first wrist axis S and the second wrist axis B intersect with each other is denoted by D1, and a distance in the extending direction of the third wrist axis T from a position where the third wrist axis T and the second wrist axis B intersect with each other to the opening of the base end side of the cylindrical pipe 120 is denoted by D2. The position where the first wrist axis S and the second wrist axis B intersect with each other and the position where the second wrist axis B and the third wrist axis T intersect with each other coincide with each other regardless of the directions of the second wrist axis B and third wrist axis T. In the wrist portion 3 according to the present embodiment, a ratio (D1/D2) of D1 to D2 is higher than one, and more definitively, two or higher.

In a case where the ratio (D1/D2) is higher than one, the lengths of the first flange portion 51 and the second flange portion 52 can be reduced as much as possible, and the second movable portion 15 can successfully support the third movable portion 16 and the end effector 8. If the ratio (D1/D2) is higher than one, and the effector cable 9 bends at the position where the second wrist axis B and the first wrist axis S intersect with each other, the effector cable 9 bends sharply due to the short distance from the position where the second wrist axis B and the first wrist axis S intersect with each other to the opening of the base end side of the cylindrical pipe 120. Therefore, to ease the bend, the effector cable 9 tends to shift its bend position to the base end side of the position through which the second wrist axis B extends and tends to bulge in a direction opposite to a direction in which the third movable portion 16 bends. This tendency becomes more significant as the ratio (D1/D2) increases.

Here, the opening of the tip end side of the cable guide 92 is formed to be larger than the opening of the base end side of the cylindrical pipe 120. Further, the effector cable 9 is not clamped at the tip end space 49 and the tip end portion of the guide hole 93. Instead, the effector cable 9 is clamped in a direction perpendicular to the first wrist axis S and the second wrist axis B at a portion of the guide hole 93, the portion being sandwiched between the second wrist motor 25 and the third wrist motor 26.

Therefore, when the ratio (D1/D2) is higher than one, and the shift of the position of the bend of the effector cable 9 and the bulge of the effector cable 9 are about to occur, the shift and bulge can be allowed by the guide hole 93 that is large in diameter. Then, the effector cable 9 can be prevented from getting entangled with the tip end portion of the cable guide 92 to bend sharply. Therefore, the breaking of the effector cable 9 can be successfully prevented while setting the ratio (D1/D2) to a high value.

Cable Insertion Portion (Structure of Cable Guide)

Figure 5:
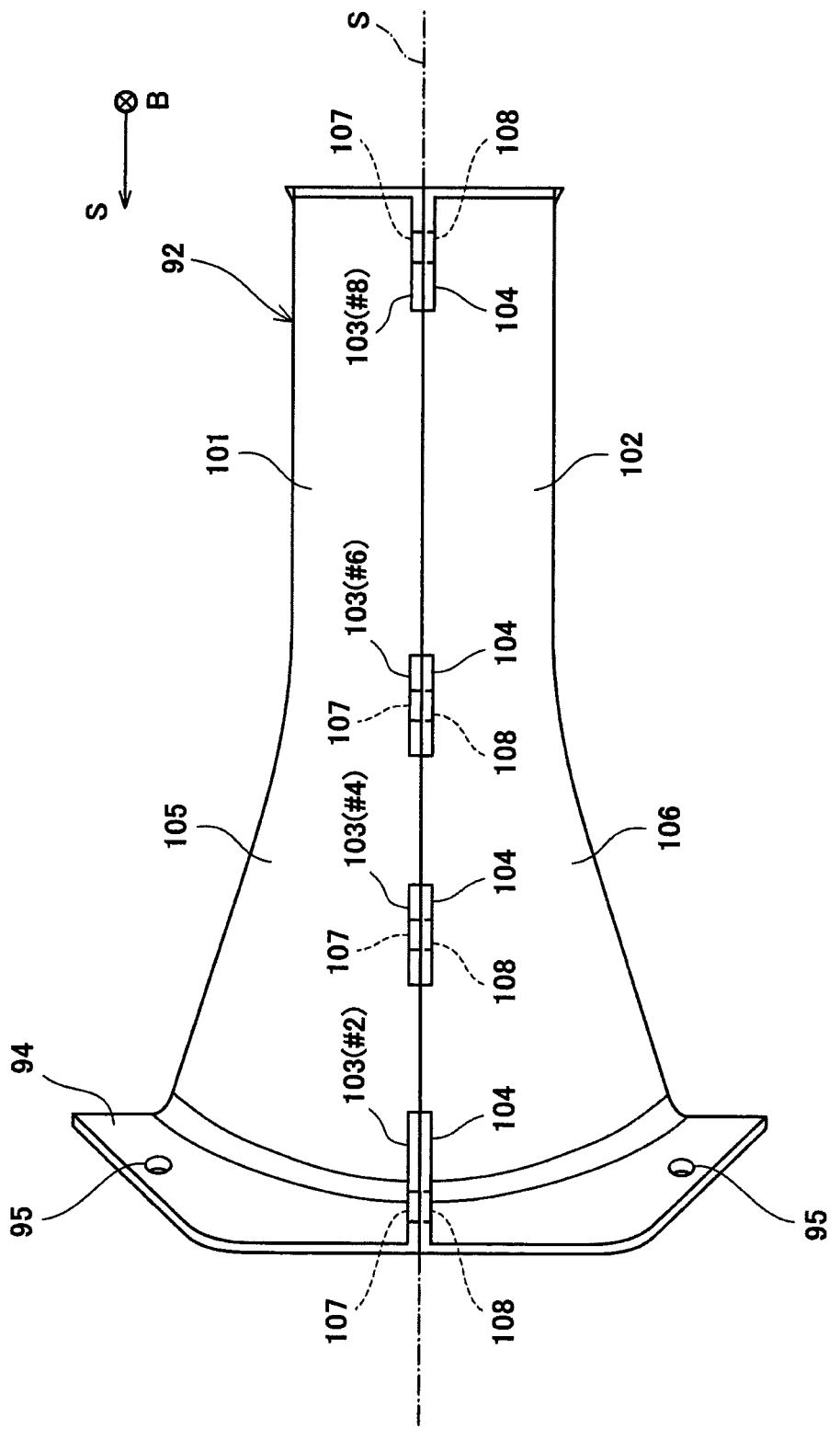
FIG. 5 is a side view of a cable guide shown in FIG. 2.
Figure 6:
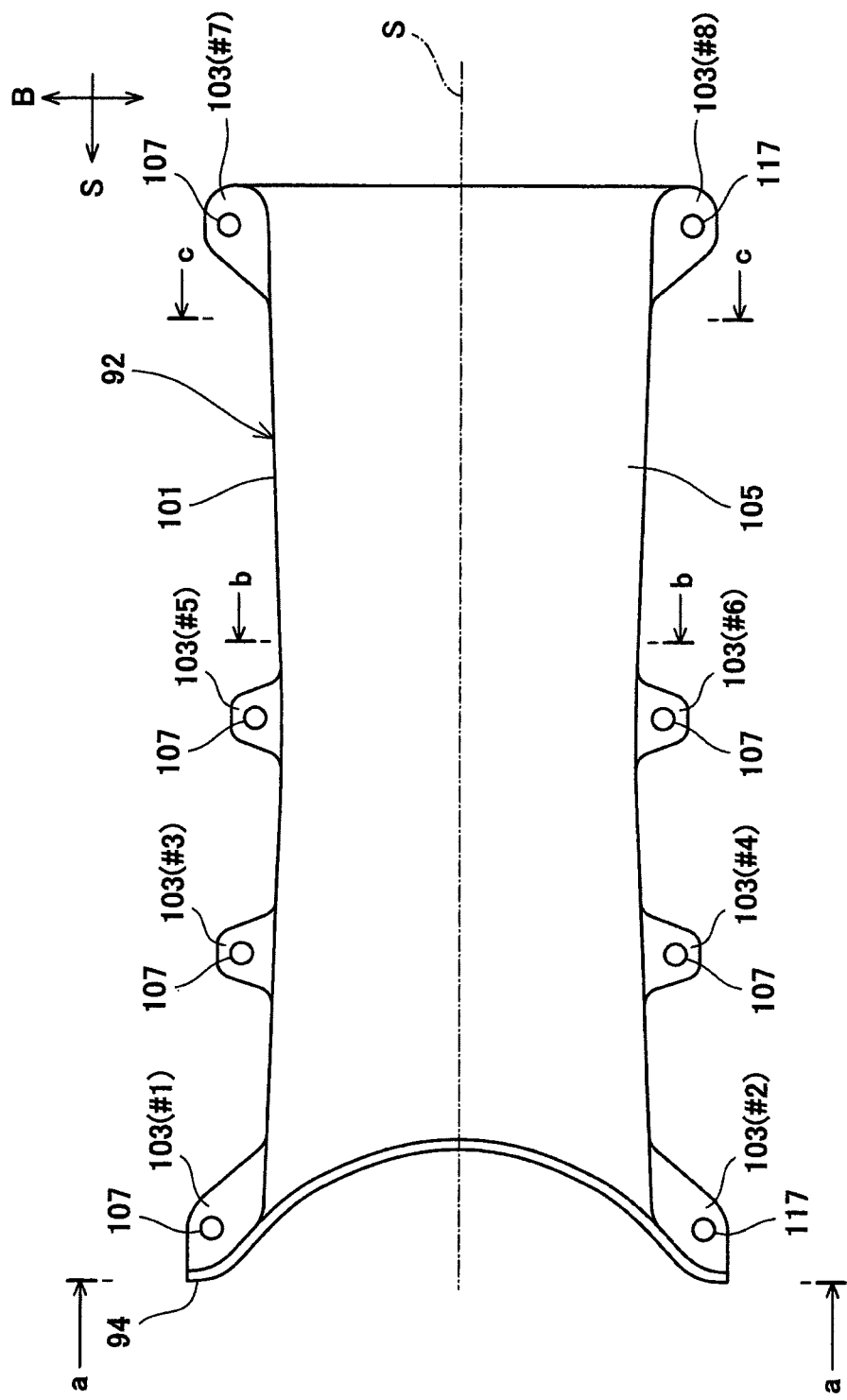
FIG. 6 is a planar view of the cable guide shown in FIG. 2.
Figure 7:
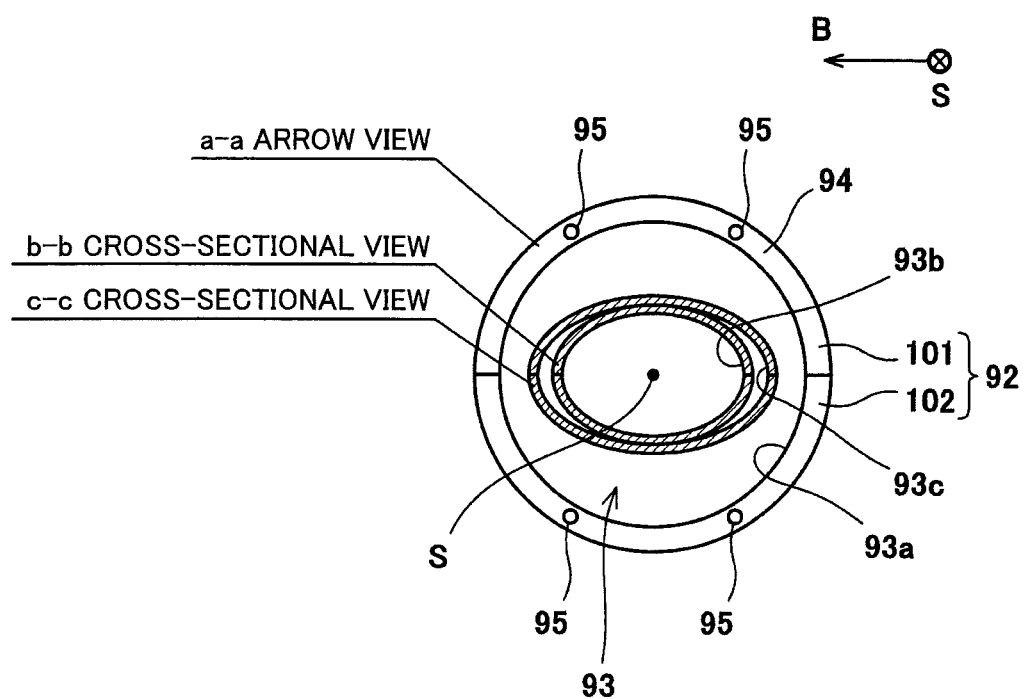
FIG. 7 is a diagram obtained by overlapping an a-a arrow view, b-b cross-sectional view, and c-c cross-sectional view of FIG. 6 with one another.

FIG. 5 is a side view of the cable guide 92 shown in FIG. 3. FIG. 6 is a planar view of the cable guide 92 shown in FIG. 3. FIG. 7 is a diagram obtained by overlapping an a-a arrow view, b-b cross-sectional view, and c-c cross-sectional view of FIG. 6 with one another. In the following explanation in reference to FIGS. 5 to 7, unless otherwise noted, the concept of directions is based on directions in a state where the cable guide 92 is attached to the first movable portion 14. For example, an upper-lower direction on the sheet of FIG. 5 corresponds to a direction perpendicular to both the first wrist axis S and the second wrist axis B, and a left-right direction on the sheet of FIG. 5 corresponds to the extending direction of the first wrist axis S. An upper-lower direction on the sheet of FIG. 6 corresponds to the extending direction of the second wrist axis B, and a left-right direction on the sheet of FIG. 6 corresponds to the extending direction of the first wrist axis S. A right side on the sheet of each of FIGS. 5 and 6 corresponds to the arm base side, and a left side on the sheet of each of FIGS. 5 and 6 corresponds to the arm tip side. In FIG. 6, a line a-a contacts an arm base side end portion of the cable guide 92, a line b-b extends through a middle portion of the cable guide 92, the middle portion being middle in the extending direction of the first wrist axis S, and a line c-c extends through an arm tip side end portion of the cable guide 92.

The cable guide 92 is formed in a tubular shape or trumpet shape as a whole. The cable guide 92 includes the guide hole 93 that extends in the extending direction of the first wrist axis S and is hollow. Both end portions of the guide hole 93 in the extending direction of the first wrist axis S (that is, an arm base side end portion and arm tip side end portion of the guide hole 93) are open.

The cross-sectional shape of the guide hole 93 is such that a middle portion thereof in the extending direction of the first wrist axis S is constricted whereas both end portions in the extending direction of the first wrist axis S (that is, the arm tip side end portion and the arm base side end portion) are spreading. A middle portion 93b of the guide hole 93 is significantly constricted in a direction perpendicular to both the first wrist axis S and the second wrist axis B as compared to both end portions 93a and 93c. Although the size of the guide hole 93 in the extending direction of the second wrist axis B becomes the smallest at the middle portion 93b (see FIGS. 6 and 7), it may be said that this size is substantially constant regardless of the position of the cable guide 92 in the extending direction of the first wrist axis S.

As is clear from the b-b cross section shown in FIG. 7, the cross-sectional shape of the middle portion 93b of the guide hole 93 is constricted so as to be narrow in the direction perpendicular to both the first wrist axis S and the second wrist axis B and is comparatively long in the extending direction of the second wrist axis B. For example, the cross-sectional shape of the middle portion 93b has an oval shape or elliptical shape that is long in the extending direction of the second wrist axis B.

An arm base side end portion 93c of the guide hole 93 is not spreading so largely as an arm tip side end portion 93a of the guide hole 93. As is clear from the c-c cross section shown in FIG. 7, the cross-sectional shape of the arm base side end portion 93c of the guide hole 93 is also narrow in the direction perpendicular to both the first wrist axis S and the second wrist axis B and long in the extending direction of the second wrist axis B. For example, the cross-sectional shape of the arm base side end portion 93c also has an oval shape or elliptical shape that is long in the extending direction of the second wrist axis B.

The arm tip side end portion 93a of the guide hole 93 is spreading more largely than, of course, the intermediate portion 93b and also than the arm base side end portion 93c. As is clear from the a-a cross section shown in FIG. 7, the cross-sectional shape of the arm tip side end portion 93a of the guide hole 93 is such that the size in the direction perpendicular to both the first wrist axis S and the second wrist axis B is substantially the same as the size in the extending direction of the second wrist axis B. With this, the cross-sectional shape of the arm tip side end portion 93a is spreading in the direction perpendicular to both the first wrist axis S and the second wrist axis B more significantly than each of the middle portion 93b and the arm base side end portion 93c. For example, the cross-sectional shape of the arm tip side end portion 93a is a diamond shape, a polygonal shape, or a circular shape.

The arm tip side end portion of the cable guide 92 includes an attachment flange 94 that spreads from the opening of the guide hole 93 toward a radially outer side. The attachment flange 94 includes a plurality of screw insertion holes 95. The cable guide 92 can be fixed to the first movable portion 14 by using screws (not shown) inserted through the screw insertion holes 95. In the present embodiment, the attachment flange 94 is formed to have an annular shape that is endless in a circumferential direction. However, a plurality of flange portions may be arranged radially from the opening of the guide hole 93 so as to correspond to only portions where the screws are used for fixation.

The cable guide 92 is formed by separably joining a first guide half body 101 and a second guide half body 102. The first guide half body 101 and the second guide half body 102 are the same in shape as each other. Thus, the cable guide 92 is divided into two parts in a direction orthogonal to both the first wrist axis S and the second wrist axis B. Therefore, a parting line of the cable guide 92 is located on the first wrist axis S. The first guide half body 101 includes a plurality of joining flanges at an end portion thereof located at one side in the extending direction of the second wrist axis B, the plurality of joining flanges being arranged at intervals in the extending direction of the first wrist axis S. These joining flanges 103 are provided so as to project toward the one side from a main body portion 105 of the first guide half body 101, the main body portion 105 forming the guide hole. Similarly, the first guide half body 101 includes a plurality of joining flanges 103 at an end portion located at the other side in the extending direction of the second wrist axis B. In the present embodiment, the joining flanges 103 are arranged at one side and the other side of the first wrist axis S so as to be symmetrical relative to the first wrist axis S, the number of joining flanges 103 at one side is equal to that at the other side (four joining flanges 103 are arranged at each of one side and the other side). In total, eight joining flanges 103 (#1 to #8) are arranged so as to be divided in the extending direction of the first wrist axis S and in the extending direction of the second wrist axis B.

As with the first guide half body 101, the second guide half body 102 includes a plurality of joining flanges 104 that are divided in the extending direction of the first wrist axis S and in the extending direction of the second wrist axis B so as to project from a main body portion 106 forming the guide hole 93 toward both sides in the extending direction of the second wrist axis B.

When joining the first guide half body 101 to the second guide half body 102, the joining flanges 103 of the first guide half body 101 are caused to respectively contact the corresponding joining flanges 105 of the second guide half body 102. With this, screw insertion holes 107 of the joining flanges 103 respectively communicate with screw insertion holes 108 of the joining flanges 104. Next, screws are inserted through eight sets of the joining flanges 103 and 105 overlapping in a direction perpendicular to the first wrist axis S and the second wrist axis. With this, the first guide half body 101 is joined to the second guide half body 102. Thus, the guide hole 93 having the above-described cross-sectional shape is formed.

Cable Insertion Portion (Arrangement of Cable Guide)

Figure 8:
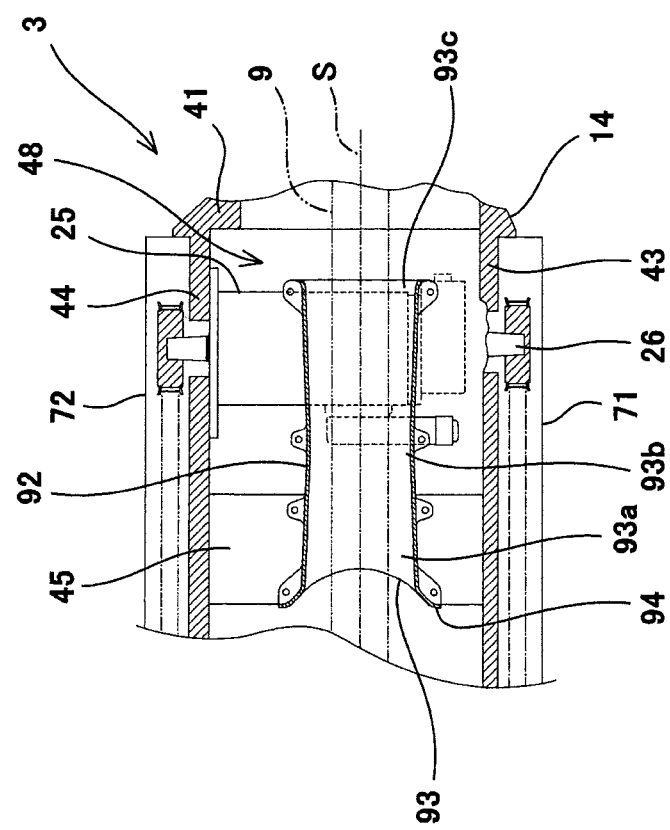
FIG. 8 is a cross-sectional diagram showing the wrist portion of FIG. 1 in a planar view.

FIGS. 8 and 9 are partial cross-sectional diagrams of the wrist portion 3 at the time of the standard posture. In FIG. 8, three wrist axes S, B, and T extend on a cross section shown therein. In FIG. 9, the first and third wrist axes S and T extend on a cross section shown therein, but the second wrist axis B is orthogonal to the cross section.

As shown in FIGS. 8 and 9, the cable guide 92 is provided at the first movable portion 14 such that the center axis of the guide hole 93 is located on the first wrist axis S. To attach the cable guide 92 to the first movable portion 14, the bridge portion 45 includes the through hole 45a extending in the extending direction of the first wrist axis S. The through hole 45a has a circular cross section, and a center axis of the through hole 45a is located on the first wrist axis S. The cable guide 92 is inserted into the through hole 45a.

The attachment flange 94 contacts an end surface of the arm tip side of the bridge portion 45 and is detachably fixed to the bridge portion 45 by using fixing elements, such as screws. In the extending direction of the first wrist axis S, the cable guide 92 is larger in size than the through hole 45a of the bridge portion 45. Therefore, the cable guide 92 extends through the through hole 45a to project from an end surface of the arm base side of the bridge portion 45 toward the arm base side in the base end space. By providing the cable guide 92 as above, the arm base side end portion of the guide hole 93 communicates with the inside of the tubular portion 41 or an arm base portion of the base end space, and the arm tip side end portion of the guide hole 93 communicates with the tip end space 49.

In the present embodiment, the bridge portion 45 serves as a guide attachment wall provided at the first movable portion 14 to attach the cable guide 92. The through hole 45a of the bridge portion 45 serves as an attachment hole provided at the guide attachment wall to attach the cable guide 92 to the first movable portion 14 such that the cable guide 92 penetrates the guide attachment wall.

The base end space is physically divided into the first base end space 47 located at an upper side at the time of the standard posture and the second base end space 48 by the cable guide 92. As described above, the second wrist motor 25 is arranged in the second base end space 47, and the third wrist motor 26 is arranged in the first base end space 47. The second and third wrist motors 25 and 26 are arranged so as to sandwich the arm base side end portion of the cable guide 92 in the direction perpendicular to the first wrist axis S and the second wrist axis B.

By providing the cable guide 92 as above, the effector cable 9 is introduced to the internal space of the tubular portion 41 to be introduced through the opening of the arm base side end portion of the cable guide 92 to the guide hole 93. After the effector cable 9 extends through the guide hole 93, the effector cable 9 is introduced through the opening of the arm tip side end portion of the cable guide 92 to the tip end space 49.

Since the cable guide 92 is provided so as to be located on the first wrist axis S that is the rotational center of the first movable portion 14, the effector cable 9 inserted through the guide hole 93 is provided so as to be also located on the first wrist axis S. Therefore, the effector cable 9 can be prevented from significantly whirling in accordance with the operation of the wrist portion 3 and interfering with structures or works around a work space.

An axial middle portion of the guide hole 93 is constricted, and both axial end portions thereof are spreading. Therefore, the effector cable 9 can be successfully prevented from being damaged by getting entangled with the end portion of the cable guide and by wearing by the end portion of the cable guide.

In addition, the first wrist axis S is surrounded by a pair of beam portions 43 and 44, and the cable guide 92 and the effector cable 9 is arranged in a space surrounded by a pair of beam portions 43 and 44. Therefore, the effector cable 9 can be protected by a pair of beam portions 43 and 44. As above, a pair of beam portions 43 and 44 serve as not only the above-described frame members, stays, and housing members but also protectors configured to protect the effector cable 9 from peripheral structures outside the robot. Therefore, the effector cable 9 can be prevented from interfering with the external structures without providing at the wrist portion 3 a dedicated structure configured to protect the effector cable 9.

The arm tip side end portion of the cable guide 92 is attached to the bridge portion 45 of the first movable portion 14, but the arm base side end portion thereof is not directly fixed to the first movable portion 14. Therefore, the cable guide 92 can be easily attached to the first movable portion 14. In this case, the cable guide 92 looks like a cantilever beam, but the arm tip side end portion thereof is sandwiched between the second and third wrist motors 25 and 26. On this account, even though the arm tip side end portion of the cable guide 92 is attached to the bridge portion 45, the entire cable guide 92 can be firmly fixed to the first movable portion 14. Even if the effector cable 9 is pressed against the inner surface of the guide hole 93 in accordance with the operation of the wrist portion 3, its stress can be received by the second and third wrist motors 25 and 26. Thus, the stress acting on the arm tip side end portion of the cable guide 92 and the bridge portion 45 can be reduced. As described above, since the second and third wrist motors 25 and 26 are attached to the first movable portion 14 so as to sandwich the first wrist axis S that is the rotational center of the first movable portion 14, the weight balance of the first movable portion becomes stable at the time of the rotation of the first movable portion 14. In addition, the power transmission mechanism connected to the second and third wrist motors 25 and 26 can be simplified.

The second wrist motor 25 is provided on an outer surface of the cable guide 92. The third wrist motor 26 is provided at a portion on the outer surface of the cable guide 92, the portion being away by substantially 180° around the first wrist axis S from the side where the second wrist motor 25 is attached. As above, the cable guide 92 also serves as a stay to which the second and third wrist motors 25 and 26 are attached. Thus, by providing the cable guide 92 in the base end space, the second and third wrist motors 25 and 26 can be provided stably. In addition, the effector cable 9 can be successfully prevented from interfering with the second or third wrist motor 25 or 26. Further, the cable guide 92 is provided at the bridge portion 45 connecting the first beam portion 43 and the second beam portion 44 and is arranged between a pair of beam portions 43 and 44, and the power transmission mechanisms 82 and 83 are respectively arranged in a pair of spaces respectively formed by the beam portions 44 and 43.

Therefore, the effector cable 9 does not interfere with the power transmission mechanisms 82 and 83.

To stably provide the motors 25 and 26 and prevent the effector cable 9 from interfering, for example, it is preferable that the aim base side end portion of the cable guide 92 project to the arm base side of the output shaft of the second wrist motor 25 and the output shaft of the third wrist motor 26.

A portion of the cable guide 92 is long in the extending direction of the second wrist axis B, the portion being sandwiched between the second and third wrist motors 25 and 26. The extending direction of the second wrist axis B corresponds to the axial direction of each of the output shafts of the second and third wrist motors 25 and 26. In the present embodiment, a housing of the second wrist motor 25 is long in the axial direction of the output shaft, and the housing of the third wrist motor 26 is long in the axial direction of the output shaft. Therefore, since the cable guide 92 provides a large installation surface on which the second and third wrist motors 25 and 26 are provided, the second and third wrist motors 25 and 26 can be stably supported by the cable guide 92.

In contrast, the portion of the cable guide 92 is short in the direction perpendicular to the first wrist axis S and the second wrist axis B, the portion being sandwiched between the second and third wrist motors 25 and 26. Especially, this tendency becomes significant at the intermediate portion due to the constriction. In the direction perpendicular to the first wrist axis S and the second wrist axis B, the guide hole 93 has a small size necessary to insert the effector cable 9 in a steady state therethrough. Therefore, while the second and third wrist motors 25 and 26 are arranged so as to sandwich the effector cable 9 and the cable guide 92 or sandwich the guide hole 93 and the effector cable 9 in the direction perpendicular to the first wrist axis S and the second wrist axis B, the second and third wrist motors 25 and 26 can be arranged close to each other in the above direction as much as possible. With this, the wrist portion 3 can be successfully prevented from increasing in size in the direction perpendicular to the first wrist axis S and the second wrist axis B.

In a case where the middle portion and arm base side end portion of the cable guide 92 are long in the extending direction of the second wrist axis B and short in the direction perpendicular to the first wrist axis S and the second wrist axis S, and the first movable portion 14 and the third movable portion 16 are located at the above-described standard rotational positions, the effector cable 9 becomes the steady state without being twisted. In a case where the first movable portion 14 or the third movable portion 16 rotates from the standard rotational position, the effector cable 9 is twisted. As described above, since the effector cable 9 is a bundle of a plurality of cables, the cross section of the front end of the effector cable 9 deforms to become an elliptical shape by twisting. To be specific, the effector cable 9 decreases in diameter to contract in one direction and increases in diameter to expand in another direction. The guide hole 93 is long in the extending direction of the second wrist axis B. Therefore, even if the cross-sectional shape of the effector cable 9 deforms by twisting, this deformation is allowed, and the effector cable 9 can be prevented from being compressed by the inner surface of the cable guide 92.

Further, in a case where the second movable portion 15 rotates from the standard rotational position in this twisted state, the effector cable 9 tends to whirl in a direction orthogonal to the first wrist axis S while rotating in a direction to untwist. Since the middle portion and arm base side end portion of the cable guide 92 are long in the extending direction of the second wrist axis B, this whirling of the effector cable 9 can be allowed. In addition, the arm tip side end portion that is an end portion closer to the second wrist axis B is spreading so as to be larger than each of the middle portion and the arm base side end portion. Therefore, even if the whirling occurs, the effector cable 9 can be prevented from being damaged.

Cable Insertion Portion (Attaching and Detaching of Cable Guide)

Figure 10A:
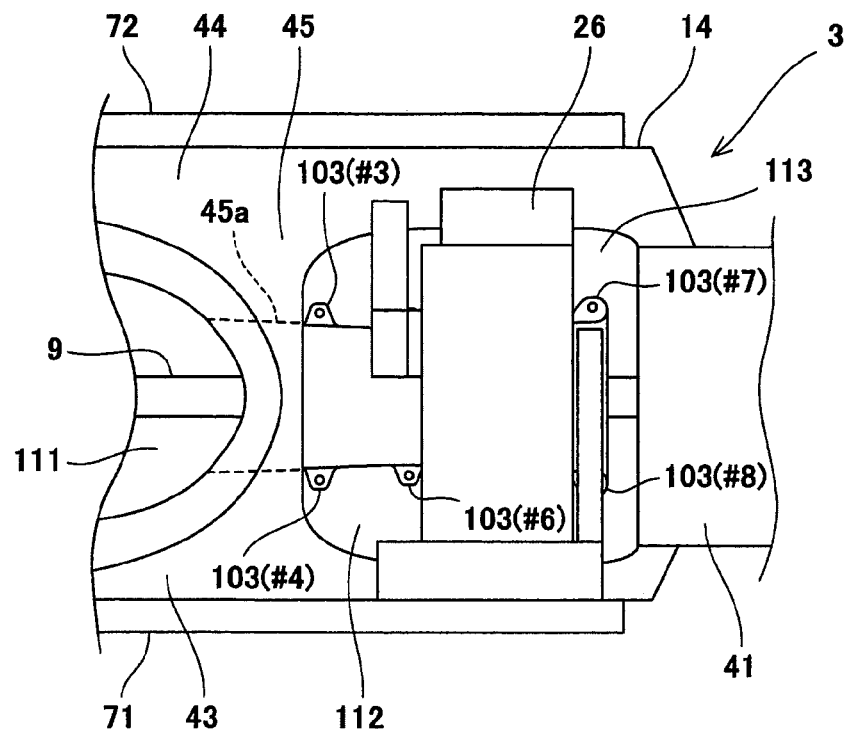
FIG. 10A is a partial planar diagram showing the wrist portion in a state where the cable guide is being attached.
Figure 10B:
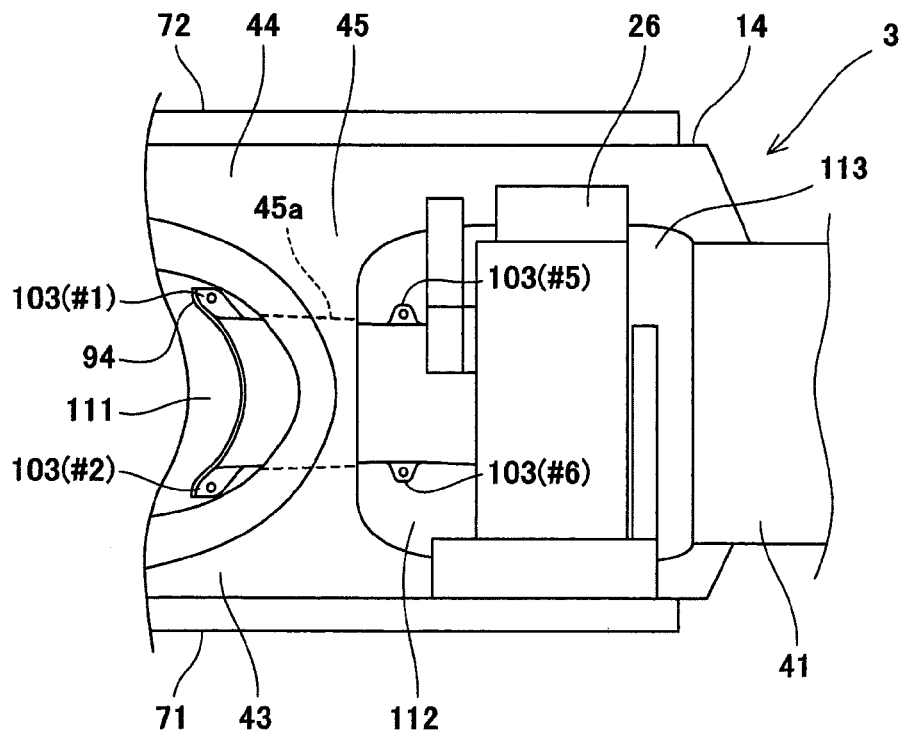
FIG. 10B is a partial planar diagram showing the wrist portion in a state where the cable guide is being pulled out.

FIG. 10A is a planar view of the first movable portion 14 in a state where the cable guide 92 is being attached. FIG. 10B is a planar view of the first movable portion 14 in a state where the cable guide 92 is being slightly pulled out. The cable guide 92 is formed to have a tubular shape, and the effector cable 9 is being inserted through the cable guide 92. Therefore, once the effector cable 9 is inserted through the cable guide 92, it is difficult to detach the cable guide 92 from the first movable portion 14. In the robot 1 according to the present embodiment, the cable guide 92 is formed by separably joining the first guide half body 101 and the second guide half body 102. Therefore, only the cable guide 92 can be detached from the first movable portion 14 without rerouting the effector cable 9.

To be specific, the second movable portion 15 includes a pair of flange portions 51 and 52 respectively coupled to the inner surfaces of a pair of beam portions 44 and 43, and a gap surrounded by a pair of flange portions 51 and 52 is formed at the tip end side of the bridge portion 45. By utilizing this gap, the cable guide 92 can be pulled out toward the arm tip side without disassembling the wrist portion 3. The first movable portion 14 is formed to have an H shape when viewed from the direction perpendicular to the first wrist axis S and the second wrist axis B, and the inside of the base end space is accessible from both sides in the above direction. The joining flanges 103 of the first guide half body 101 respectively overlap the joining flanges 104 of the second guide half body 102 in the direction perpendicular to the first wrist axis S and the second wrist axis B, and the screws are inserted through the joining flanges 103 and 104 in the above direction.

At a portion where the second and third wrist motors 25 and 26 are arranged so as to overlap each other, the inside of the base end space is not accessible because of interference with the motors 25 and 26. In the present embodiment, the second and third wrist motors 25 and 26 are arranged so as to be away from an arm base side end surface of the bridge portion 45 toward the arm base side. In addition, the second and third wrist motors 25 and 26 are arranged so as to be away from an arm tip side end surface of the tubular portion 41 toward the arm tip side. As a result, in the base end space, a space that is accessible from the outside of the first movable portion 14 is formed among the bridge portion 45 and the second and third wrist motors 25 and 26, and another space that is accessible from the outside of the first movable portion 14 is formed among the second and third wrist motors 25 and 26 and the tubular portion 41. In the following explanation, an accessible space located at the arm tip side of the bridge portion 45 is referred to as a "first access space 111", an accessible space among the bridge portion 45 and the motors 25 and 26 is referred to as a "second access space 112", and an accessible space among the motors 25 and 26 and the tubular portion 41 is referred to as a "third access space 113".

Next, a procedure to detach the cable guide 92 will be explained. As shown in FIG. 10A, in a state where the cable guide 92 is being attached to the first movable portion 14, the screws are detached from the joining flanges 103 each exposed to the second access space 112 or the third access space 113. In the present embodiment, the joining flanges 103

(#3), 103 (#4), 103 (#6) are exposed to the second access space 112, the joining flange 103 (#7) is exposed to the third access space 113.

Next, the screws inserted through the attachment flange 94 are detached, and the cable guide 92 is detached from the bridge portion 45. Next, the cable guide 92 is pulled out toward the arm tip side. As shown in FIG. 10B, in this process of pulling out the cable guide 92, the joining flanges 103 (#1) and 103 (#2) provided at the arm tip end portion are exposed to the first access space 111. When the joining flanges 103 (#1) and 103 (#2) are exposed, the screws inserted through the joining flanges 103 (#1) and 103 (#2) are detached. In addition, in this process of pulling out the cable guide 92, the joining flanges 103 (#5) and 103 (#8) are exposed to the second access space. When the joining flanges 103 (#5) and 103 (#8) are exposed, the screws inserted through the joining flanges 103 (#5) and 103 (#8) are detached.

When the screws are detached from all the joining flanges 103 (#1 to #8) as above, the first guide half body 101 and the second guide half body 102 are disassembled. These two guide half bodies 101 and 102 are detached one by one.

By the above procedure, the cable guide including the guide hole 93 which has a tubular shape and through which the effector cable 9 is inserted can be detached from the first movable portion 14 without disassembling the first movable portion 14 or rerouting the effector cable 9. Therefore, the cable guide 92 can be easily replaced. The maintenance work of the effector cable 9 may become convenient by canceling a state where the effector cable 9 is being inserted through the cable guide 92. In such a case, the maintenance work of the effector cable 9 becomes easy. When attaching the cable guide 92 to the first movable portion 14 again, a procedure opposite to the above may be performed.

The foregoing has explained the embodiment of the present invention. However, the present invention is not limited to the above configuration, and modifications may be suitably made within the scope of the present invention. For example, the second wrist motor 25 and the third wrist motor 26 may be arranged in the tip end space 49. In a case where the motors 25 and 26 are arranged in the base end space as in the present embodiment, the center of gravity of the first movable portion 14 can be caused to be located at the base end side in the longitudinal direction as much as possible, so that the load acting on the base end portion of the first movable portion 14 can be reduced. To realize a structure in which the first beam portion 43 and the second beam portion 44 sandwiches the second movable portion 15 in the extending direction of the second wrist axis B, the first beam portion 43 and the second beam portion 44 need to be opposed to each other at the tip end side. However, the first beam portion 43 and the second beam portion 44 do not have to be opposed to each other at the base end side. Therefore, the structure in which the end portions of the motors 25 and 26 are exposed as described above is easily realized.

INDUSTRIAL APPLICABILITY

The present invention has an excellent operational advantage in which the entire configuration of the wrist portion can be reduced in size while routing the effector cable such that smooth operations are not hindered. Thus, it is beneficial to utilize the present invention in multiple joint industrial robots, such as vertical multiple-joint spot welding robots.

REFERENCE SIGNS LIST

S first wrist axis
B second wrist axis
T third wrist axis
1 multiple-joint industrial robot
2 arm portion
3 wrist portion
4 motor cable
4a slack portion
8 end effector
9 effector cable
14 first movable portion
15 second movable portion
16 third movable portion
24 first wrist motor
25 second wrist motor
26 third wrist motor
36 outer tube portion
37 cable introduction portion
41 tubular portion
45 bridge portion
45a through hole
70 cable insertion portion
92 cable guide
93 guide hole
94 attachment flange
101 first guide half body
102 second guide half body
103, 104 joining flange

The invention claimed is:

1. A multiple-joint industrial robot comprising:
an arm portion;
a wrist portion coupled to a tip end portion of the arm portion; and
a plurality of motors configured to drive the wrist portion,
wherein:
the wrist portion includes
a first movable portion coupled to the arm portion and configured to rotate relative to the arm portion around a first wrist axis,
a second movable portion coupled to the first movable portion and configured to rotate relative to the first movable portion around a second wrist axis extending in a direction perpendicular to the first wrist axis,
a third movable portion, which is coupled to the second movable portion and configured to rotate relative to the second movable portion around a third wrist axis extending in a direction different from a direction in which the second wrist axis extends, and to which an end effector is attached, and
a cable insertion portion through which an effector cable is inserted, the effector cable being used to supply at least one of electric power, power, signals, and materials to the end effector;
a cable guide is disposed in the cable insertion portion, the cable guide being attached to an inner surface of the first movable portion so as to be extending along the first wrist axis and configured to rotate integrally with the first movable portion, the cable guide including a guide hole extending along the first wrist axis, the guide hole having an opening at an end portion at an arm tip side in a direction along the first wrist axis and an opening at an end portion at an arm base side in the direction along the first wrist axis, and the effector cable being inserted through the guide hole;
two motors among the plurality of motors are attached to an outer surface of a middle portion, which is middle in the direction along the first wrist axis, of the cable guide so as to overlap each other in a direction which is perpendicular to the first wrist axis and is parallel with the second wrist axis, and sandwich the cable guide in the direction which is perpendicular to the first wrist axis and is parallel with the second wrist axis, and a portion of the guide hole which is sandwiched between the two motors is constricted such that a length of the portion of the guide hole in a direction perpendicular to both the first wrist axis and the second wrist axis is shorter than a length of the portion of the guide hole in a direction parallel with the second wrist axis, and the guide hole is spreading from the portion of the guide hole toward the arm tip side.

2. The multiple-joint industrial robot according to claim 1, wherein:

the third wrist axis is perpendicular to the second wrist axis;

the plurality of motors include a first wrist motor configured to cause the first movable portion to rotate, a second wrist motor configured to cause the second movable portion to rotate, and a third wrist motor configured to cause the third movable portion to rotate; and the two motors are the second wrist motor and the third wrist motor.

3. The multiple-joint industrial robot according to claim 2, wherein:

the first wrist axis extends in a longitudinal direction of the first movable portion; and an output shaft of the second wrist motor and an output shaft of the third wrist motor extend in a direction perpendicular to the first wrist axis.

4. The multiple-joint industrial robot according to claim 1, wherein:

the first movable portion includes a guide attachment wall to which the cable guide is attached;

the end portion of the cable guide at the arm tip side is attached to the guide attachment wall; and the end portion of the cable guide at the arm base side is sandwiched between the two motors.

5. The multiple-joint industrial robot according to claim 4, wherein:

the cable guide is formed by separably joining a first guide half body and a second guide half body;

the cable guide is attached to the guide attachment wall so as to be inserted into an attachment hole provided at the guide attachment wall; and in a state where the cable guide is being attached to the guide attachment wall or the cable guide is being pulled out from the attachment hole, a joining portion configured to join the first guide half body to the second guide half body is accessible from an outside of the first movable portion.

6. The multiple-joint industrial robot according to claim 1, further comprising:

a motor cable through which the electric power and the signals are supplied to the two motors, wherein:

the first movable portion includes a substantially cylindrical tubular portion coupled to the arm portion so as to be rotatable;

the motor cable is clamped by a fixing clamp fixed to the arm portion and a movable clamp fixed to the first movable portion;

the motor cable includes a slack portion located between the fixing clamp and the movable clamp; and the slack portion is arranged along an outer peripheral surface of the tubular portion.

7. The multiple-joint industrial robot according to claim 6, wherein:

the arm portion includes a substantially cylindrical outer tube portion surrounding the tubular portion;

a cable housing space is formed between the outer peripheral surface of the tubular portion and an inner peripheral surface of the outer tube portion;

the outer tube portion includes a cable introduction portion through which the motor cable is introduced from an outside of the outer tube portion to an inside of the cable housing space;

the motor cable extends from the cable introduction portion through the cable housing space to the two motors; and the slack portion is arranged in the cable housing space.

8. The multiple-joint industrial robot according to claim 1, wherein:

the cable insertion portion further includes a cylindrical pipe which is fixed to the third movable portion and through which the effector cable is inserted; and the opening of the guide hole at the arm tip side is larger than an opening of the cylindrical pipe at the arm base side.

* * * * *